(12) United States Patent
Suzuki et al.

(10) Patent No.: US 10,498,471 B2
(45) Date of Patent: Dec. 3, 2019

(54) MONITORING APPARATUS, WIRELESS COMMUNICATION SYSTEM AND COMMUNICATION QUALITY MONITORING METHOD

(71) Applicant: MITSUBISHI ELECTRIC CORPORATION, Chiyoda-ku, Tokyo (JP)

(72) Inventors: Kazumasa Suzuki, Tokyo (JP); Hiroyasu Sano, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/070,912

(22) PCT Filed: Jan. 27, 2016

(86) PCT No.: PCT/JP2016/052310
§ 371 (c)(1),
(2) Date: Jul. 18, 2018

(87) PCT Pub. No.: WO2017/130317
PCT Pub. Date: Aug. 3, 2017

(65) Prior Publication Data
US 2019/0028214 A1 Jan. 24, 2019

(51) Int. Cl.
*H04B 17/309* (2015.01)
*H04W 4/44* (2018.01)
(Continued)

(52) U.S. Cl.
CPC .............. *H04B 17/309* (2015.01); *B01L 3/12* (2013.01); *B61L 3/125* (2013.01); *H04B 1/7136* (2013.01);
(Continued)

(58) Field of Classification Search
CPC .. H04B 17/309; H04B 1/7143; H04B 1/7136; B61L 3/12; B61L 3/125; H04W 24/08; H04W 4/04
See application file for complete search history.

(56) References Cited

U.S. PATENT DOCUMENTS

2005/0133673 A1* 6/2005 Sugita ..................... B61L 3/125
246/167 R
2015/0078276 A1* 3/2015 Nagasaki ................ B60L 15/40
370/329

FOREIGN PATENT DOCUMENTS

JP 2009-12489 A 1/2009
JP 2012-175663 A 9/2012
(Continued)

OTHER PUBLICATIONS

International Search Report (PCT/ISA/210) dated Apr. 19, 2016, by the Japanese Patent Office as the International Searching Authority for International Application No. PCT/JP2016/052310.

*Primary Examiner* — Joseph E Dean, Jr.
(74) *Attorney, Agent, or Firm* — Buchanan, Ingersoll & Rooney PC

(57) ABSTRACT

A radio wave monitoring apparatus includes a communication quality evaluation unit which notifies degradation of communication quality of wireless communication when a non-transmission probability exceeds a threshold, the non-transmission probability having been calculated based on measurement results of communication quality of wireless communication between an on-board station mounted on a train traveling on a track and ground stations installed along the track, and a condition by which it is determined that transmission information is unreachable in the wireless communication.

16 Claims, 18 Drawing Sheets

(51) Int. Cl.
   *H04B 1/7143* (2011.01)
   *H04B 1/7136* (2011.01)
   *B61L 3/12* (2006.01)
   *H04W 24/08* (2009.01)
   *H04W 4/029* (2018.01)
   *B01L 3/12* (2006.01)
   *H04W 4/42* (2018.01)

(52) U.S. Cl.
   CPC ............ *H04B 1/7143* (2013.01); *H04W 4/42* (2018.02); *H04W 4/44* (2018.02); *H04W 24/08* (2013.01); *H04W 4/029* (2018.02)

(56) References Cited

FOREIGN PATENT DOCUMENTS

| | | |
|---|---|---|
| JP | 2015-159700 A | 9/2015 |
| JP | 2015-231791 A | 12/2015 |

\* cited by examiner

MONITORING APPARATUS, WIRELESS COMMUNICATION SYSTEM AND COMMUNICATION QUALITY MONITORING METHOD

FIELD

The present invention relates to a monitoring apparatus which monitors communication quality in a wireless communication system, a wireless communication system, and a communication quality monitoring method.

BACKGROUND

In recent years, a wireless train control system attracts attention. The wireless train control system performs wireless communication between a train and a wireless base station installed along a track, and performs train operation control and speed control based on information transmitted by the wireless communication. The wireless train control system is advantageous in terms of introduction cost and maintenance cost because a track circuit is unnecessary as compared with a conventional method for controlling a train operation by a fixed block section. Since the wireless train control system can construct a flexible block section which is not bounded by a fixed section, it is possible to increase operation density of trains, which is advantageous also in terms of operational cost.

In the wireless train control system, 2.4 GHz Industry-Science-Medical (ISM) band which does not require a license is often used for wireless communication between the ground and a train, that is, ground-train wireless communication, from the viewpoint of cost. The 2.4 GHz ISM band is widely used also in other systems than the wireless train control system, for example, systems such as wireless Local Area Network (LAN) and Bluetooth (registered trademark). The use of these other systems in trains or in railroad buildings can be a major source of interference for the wireless train control system. Therefore, countermeasures against interference are important in the wireless train control system in order to perform stable communication.

As an example of countermeasures against interference, Patent Literature 1 describes a wireless communication system having a function of monitoring a wireless communication state for the purpose of grasping deterioration of a radio wave environment. Patent Literature 1 discloses a method in which a bit error rate at a time of communication is measured and a warning is given when the measured bit error rate increases to be equal to or larger than a threshold.

CITATION LIST

Patent Literature

Patent Literature 1: Japanese Patent Application Laid-open No. 2009-12489

SUMMARY

Technical Problem

It is important for the wireless train control system to be able to transmit a control message for reliably performing train control between a train and the ground at regular intervals. In order to achieve reliable transmission, a system is generally constructed in which it is considered sufficient when one packet can be transmitted, after a packet which includes a control message, that is, control information stored therein is transmitted a plurality of times within a certain period. In the wireless train control system, when the control information cannot be received for a certain period of time on the train side, control for stopping the train or the like is performed so that unintended control based on old information is not performed. In that case, even if the train side fails to receive control information once, a normal operation can be continued if the train side can receive data within a certain period of time.

On the other hand, in Patent Literature 1, radio quality is evaluated based on a bit error rate when wireless transmission is actually performed. It is unknown which bit is erroneous on the reception side. Therefore, in Patent Literature 1, when a transmission packet is determined to be an error by error detection with an error detection code using Cyclic Redundancy Code (CRC) or the like, the bit error rate is calculated based on error determination results of a certain number of transmission packets in the past assuming that one bit error is present. Considering that there is no need to determine that the control information is unreachable even if the train side fails to receive the control information once as described above, the bit error rate described in Patent Literature 1 is different from a probability that control information is unreachable defined in the wireless communication system directly. Accordingly, if the probability that control information is unreachable is calculated only using the bit error rate described in Patent Literature 1, a non-transmission probability of control information to be evaluated originally, that is, a probability that the control information is not correctly transmitted is not always calculated.

The present invention has been made in view of the above, and an object thereof is to obtain a monitoring apparatus capable of appropriately evaluating a probability that control information is not correctly transmitted in a wireless communication system.

Solution to Problem

In order to solve the above-described problem and to achieve the object, a monitoring apparatus according to the present invention includes: an evaluation unit which notifies degradation of communication quality of wireless communication when a non-transmission probability exceeds a threshold, the non-transmission probability having been calculated based on measurement results of communication quality of wireless communication between an on-board station mounted on a moving object traveling on a predetermined route and ground stations installed along the route, and a condition by which it is determined that transmission information is unreachable in the wireless communication.

Advantageous Effects of Invention

The monitoring apparatus according to the present invention has an effect of appropriately evaluating a probability that the control information is not correctly transmitted in a wireless communication system.

DESCRIPTION OF EMBODIMENTS

Hereinafter, a monitoring apparatus, a wireless communication system, and a communication quality monitoring method according to each embodiment of the present invention will be described in detail with reference to the drawings. The invention is not limited to the embodiments.

First Embodiment

Figure 1:
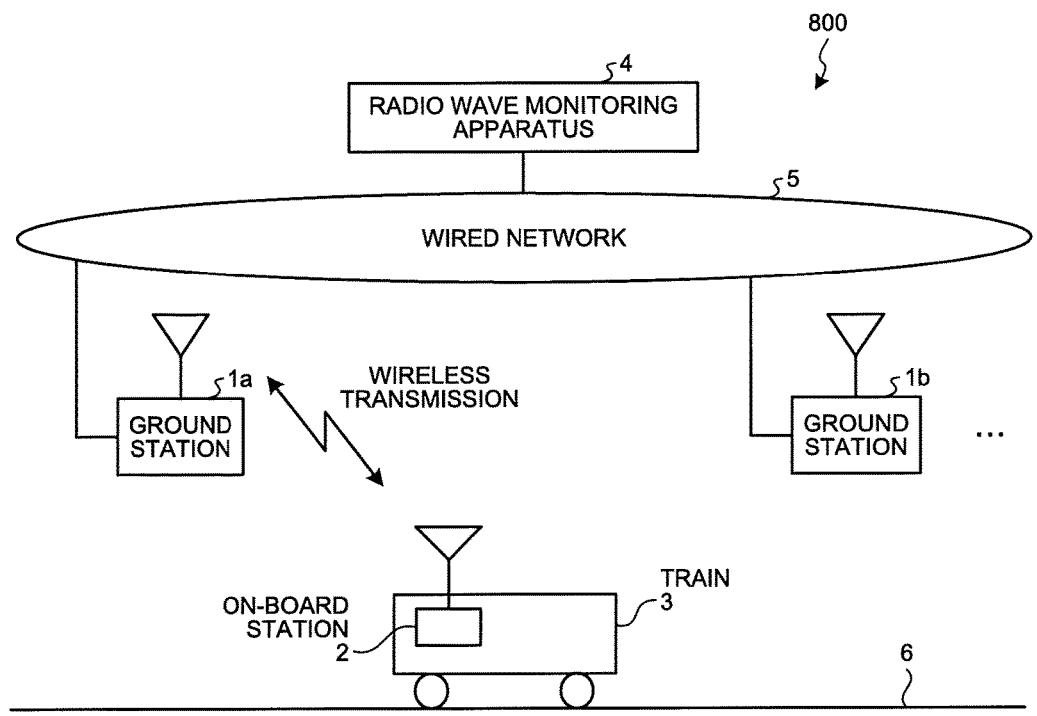
FIG. 1 is a diagram illustrating a configuration example of a wireless communication system according to a first embodiment.

FIG. 1 is a diagram illustrating a configuration example of a wireless communication system according to a first embodiment of the present invention. The wireless communication system 800 of the present embodiment is a system also called a wireless train control system which controls a train 3 as a moving object traveling on a track 6 as a predetermined route. The wireless communication system 800 of the present embodiment includes a plurality of ground stations 1, a radio wave monitoring apparatus 4, and the train 3. In FIG. 1, among the ground stations 1, ground stations 1a and 1b are exemplified. The ground stations 1 are installed at the wayside of the track 6 at intervals of, for example, several tens of meters to several hundreds of meters. That is, the ground stations 1 are installed along the track 6.

An on-board station 2 performs wireless communication with the ground stations 1. The ground stations 1 and the radio wave monitoring apparatus 4 are connected to a wired network 5, and the ground stations 1 and the radio wave monitoring apparatus 4 can communicate with each other via the wired network 5. An operation control device (not illustrated) and the like are connected to the wired network 5. The radio wave monitoring apparatus 4 as a monitoring apparatus monitors communication quality of the wireless communication between the ground stations 1 and the on-board station 2 based on data measured by the ground stations 1 and the on-board station 2.

Figure 2:
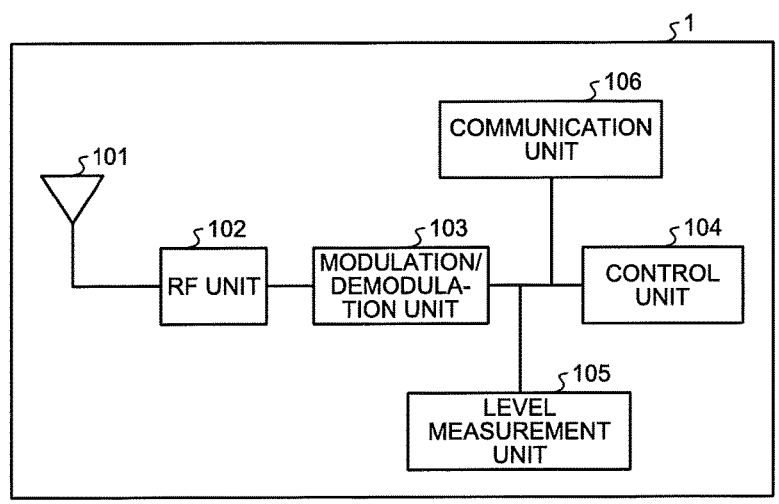
FIG. 2 is a configuration diagram illustrating a configuration example of a ground station of the first embodiment.

FIG. 2 is a configuration diagram illustrating a configuration example of the ground station 1 of the present embodiment. The ground station 1 includes an antenna 101, a Radio Frequency (RF) unit 102, a modulation/demodulation unit 103, a control unit 104, a level measurement unit 105, and a communication unit 106. The antenna 101 radiates a signal output from the RF unit 102 as a radio signal in the air and receives a radio signal propagating in the air. The RF unit 102 converts a signal output as a digital signal from the modulation/demodulation unit 103 into an analog signal, performs frequency conversion into a carrier frequency, and outputs the analog signal to the antenna 101. The RF unit 102 performs frequency conversion of an analog signal which is a radio signal received by the antenna 101 into baseband, converts the analog signal into a digital signal, and outputs the digital signal to the modulation/demodulation unit 103.

The modulation/demodulation unit 103 performs encoding and modulation processes on transmission data, and outputs a processed signal to the RF unit 102. In addition, the modulation/demodulation unit 103 performs demodulation and decoding processes on the signal output from the RF unit 102, that is, a received signal. The control unit 104 performs transmission control for transmitting data received from the wired network 5 as a radio signal and performs control for outputting a received radio signal to the wired network 5. The level measurement unit 105 measures the level of a received radio signal, that is, received power, received voltage, or the like, as communication quality. The communication unit 106 performs communication via the wired network 5.

Figure 3:
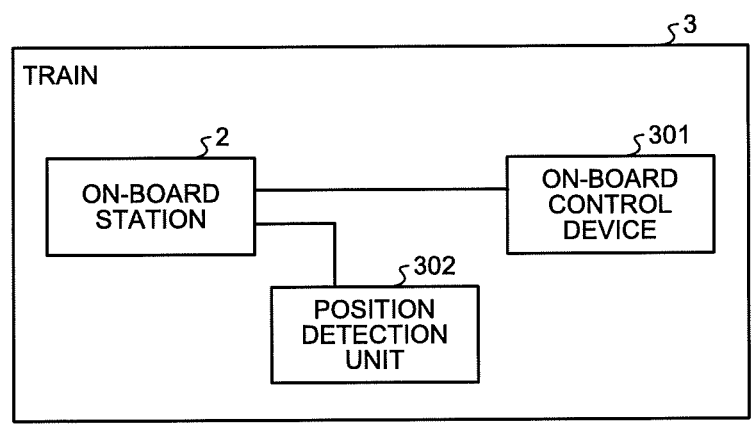
FIG. 3 is a diagram illustrating a configuration example of a train of the first embodiment.

FIG. 3 is a diagram illustrating a configuration example of the train 3 of the present embodiment. The train 3 includes the on-board station 2, an on-board control device 301, and a position detection unit 302. The on-board station 2 receives a radio signal, performs processes such as demodulation and decoding processes on the received radio signal, and outputs obtained data to the on-board control device 301. The on-board station 2 transmits control information such as position information indicating a position of the train 3 output from the position detection unit 302 as a radio signal. The control information is a kind of transmission information transmitted between the on-board station 2 and the ground stations 1. The on-board control device 301 performs control including stopping and speed change of the train based on the data received by the on-board station 2, that is, the data output from the on-board station 2. The position detection unit 302 detects the position of the train 3 and outputs a result of the detection to the on-board station 2 as position information.

Figure 4:
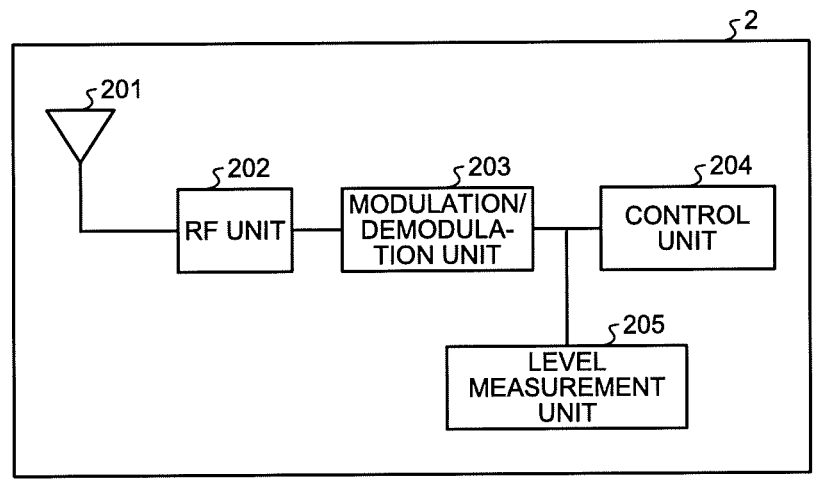
FIG. 4 is a diagram illustrating a configuration example of an on-board station of the first embodiment.

FIG. 4 is a diagram illustrating a configuration example of the on-board station 2 of the present embodiment. The on-board station 2 includes an antenna 201, an RF unit 202, a modulation/demodulation unit 203, a control unit 204, and a level measurement unit 205. The RF unit 202, the modulation/demodulation unit 203, and the level measurement unit 205 have functions similar to those of the RF unit 102, the modulation/demodulation unit 103, and the level measurement unit 105 of the ground station 1, respectively. The control unit 204 performs transmission control for transmitting control information including the position information output from the position detection unit 302 and transmission data output from the on-board control device 301 as a radio signal, and performs control for outputting a received radio signal to the on-board control device 301.

Figure 5:
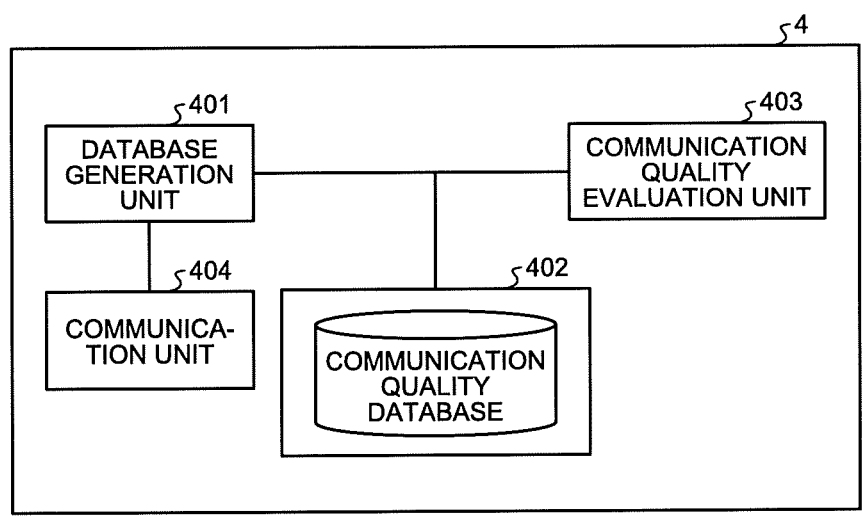
FIG. 5 is a diagram illustrating a configuration example of a radio wave monitoring apparatus of the first embodiment.

FIG. 5 is a diagram illustrating a configuration example of the radio wave monitoring apparatus 4 of the present embodiment. The radio wave monitoring apparatus 4 includes a database generation unit 401, a storage unit 402, a communication quality evaluation unit 403, and a communication unit 404. In the storage unit 402, a communication quality database is stored. The communication quality database is a database in which communication quality information between the ground stations 1 and the train 3 is stored. The database generation unit 401 generates communication quality information based on communication quality measured in the wireless communication system 800 and input from the communication unit 404, and stores the generated communication quality information in the communication quality database. The communication quality evaluation unit 403 refers to data in the communication quality database to evaluate communication quality. The communication unit 404 performs communication via the wired network 5 and outputs the communication quality measured in the wireless communication system 800 and received from the wired network 5 to the database generation unit 401.

Next, hardware configurations of the ground station 1 and the on-board station 2 of the present embodiment will be described. The RF unit 102 of the ground station 1 and the RF unit 202 of the on-board station 2 are configured by analog circuits which perform frequency conversion and the like, analog-digital converters, digital-analog converters, or the like. The modulation/demodulation unit 103 of the ground station 1 and the modulation/demodulation unit 203 of the on-board station 2 are each a modulator and demodulator. The level measurement unit 105 of the ground station 1 and the level measurement unit 205 of the on-board station 2 are each a measurement device which receives a radio signal and measures power, voltage, or the like of the received radio signal. The communication unit 106 of the ground station 1 is a transmitter and receiver.

The control unit 104 of the ground station 1 and the control unit 204 of the on-board station 2 are each a processing circuit. The processing circuit may be dedicated hardware, or a control circuit including a memory and a central processing unit (CPU, also referred to as a central processor, a processing unit, an arithmetic unit, a microprocessor, a microcomputer, a processor, or a digital signal processor (DSP)), which executes a program stored in the memory. Here, the memory corresponds to, for example, a non-volatile or volatile semiconductor memory such as a Random Access Memory (RAM), a Read Only Memory (ROM), a flash memory, an Erasable Programmable Read Only Memory (EPROM), or an Electrically Erasable Programmable Read Only Memory (EEPROM), a magnetic disk, a flexible disk, an optical disk, a compact disc, a mini disk, or a Digital Versatile Disk (DVD).

Figure 6:
FIG. 6 is a diagram illustrating a configuration example when a processing circuit of the first embodiment is configured by dedicated hardware.

When the processing circuit is achieved by dedicated hardware, the processing circuit is a processing circuit 900 illustrated in FIG. 6, and is, for example, a single circuit, a composite circuit, a programmed processor, a parallel programmed processor, an Application Specific Integrated Circuit (ASIC), a Field Programmable Gate Array (FPGA), or a combination thereof. FIG. 6 is a diagram illustrating a configuration example when the processing circuit is configured by dedicated hardware.

Figure 7:
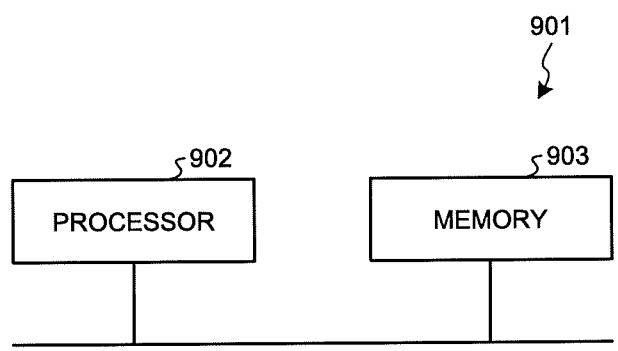
FIG. 7 is a diagram illustrating a configuration example of a control circuit of the first embodiment.

When the processing circuit which achieves the control unit 104 is achieved by a control circuit including a CPU, the control circuit is a control circuit 901 configured as illustrated in FIG. 7, for example. FIG. 7 is a diagram illustrating a configuration example of the control circuit. As illustrated in FIG. 7, the control circuit 901 includes a processor 902 which is a CPU and a memory 903. When the control unit 104 is achieved by the control circuit 901, the control unit 104 is achieved by the processor 902 reading and executing programs corresponding to the control units 104 and 204 stored in the memory 903. The memory 903 is also used as a temporary memory in each process performed by the processor 902.

Next, a hardware configuration of the radio wave monitoring apparatus 4 of the present embodiment will be described. The communication unit 404 is a transmitter and receiver. The storage unit 402 is a memory.

The database generation unit 401 and the communication quality evaluation unit 403 are each a processing circuit. The processing circuit may be dedicated hardware or a control circuit including a memory and a CPU which executes a program stored in the memory. When the processing circuit is dedicated hardware, the processing circuit is similar to the processing circuit 900 illustrated in FIG. 6. When the processing circuit is achieved by a control circuit including a CPU, the control circuit is similar to the control circuit 901 illustrated in FIG. 7. When the database generation unit 401 and the communication quality evaluation unit 403 are achieved by the control circuit 901, the database generation unit 401 and the communication quality evaluation unit 403 are achieved by the processor 902 reading and executing programs corresponding to the database generation unit 401 and the communication quality evaluation unit 403 stored in the memory 903. The memory 903 is also used as a temporary memory in each process performed by the processor 902. When the database generation unit 401 and the communication quality evaluation unit 403 are achieved by the control circuit 901, the memory which achieves the storage unit 402 and the memory 903 may be the same memory.

Next, an operation will be described. The on-board station 2 of the train 3 traveling on the track 6 is connected to the ground station 1 via a wireless link, and performs wireless communication with the ground station 1. The ground station 1 to which the on-board station 2 is connected is basically the ground station 1 located closest to the on-board station 2 and is the ground station 1a in the example illustrated in FIG. 1. In FIG. 1, the ground station 1a is connected to the on-board station 2 of one train 3 by the wireless link. However, if a plurality of trains 3 is on track in an area covered by the ground station 1a, the ground station 1a is connected to a plurality of on-board stations 2 simultaneously by wireless links. Similarly, if a plurality of trains 3 is on track in the area covered by the ground station 1 other than the ground station 1a, the ground station 1 is connected to a plurality of on-board stations 2 simultaneously by the wireless links. Hereinafter, when it is stated that the ground station 1 and the on-board station 2 are connected, it means that the ground station 1 and the on-board station 2 are connected via the wireless link. Any method may be used for establishing the wireless link between the ground station 1 and the on-board station 2, and a method generally performed in the wireless train control system can be used.

The wireless communication between the ground station 1 and the on-board station 2 is performed bidirectionally. The on-board station 2 transmits position information of the train 3 and the like to the ground station 1. The position information is information indicating the position of the train 3 detected by the position detection unit 302 illustrated in FIG. 3. As a method for detecting the position of the train 3 in the position detection unit 302, there are, for example, a method using a Global Positioning System (GPS), and a method which performs calculation based on starting position information transmitted from a ground coil to a pickup coil and a moving distance obtained from a tachometer generator which measures a rotation speed of a wheel.

The ground station 1 transmits a stop limit position and the like of each train 3 calculated based on the position information of each train 3 to the corresponding on-board station 2. Specifically, the ground station 1 transmits the position information received from each train 3 to the operation control device (not illustrated in FIG. 1), and the operation control device calculates the stop limit position of each train 3 based on the position information of each train 3, and transmits the stop limit position to the ground station 1 via the wired network 5. The ground station 1 transmits stop limit position information received from the operation control device to each train 3 as a radio signal. In the train 3, the on-board station 2 receives the stop limit position information as a radio signal and outputs the stop limit position to the on-board control device 301. The on-board control device 301 stops the train 3 and controls the speed of the train 3 based on the stop limit position information. Here, the operation control device calculates the stop limit position of each train 3 based on the position information of each train 3. However, the ground station 1 may calculate the stop limit position of each train 3 based on the position information of each train 3.

Figure 8:
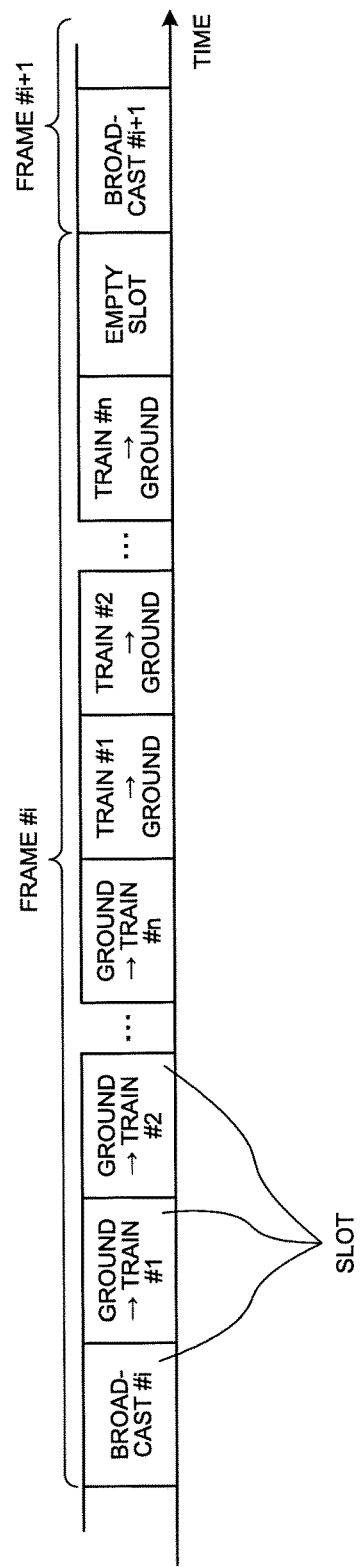
FIG. 8 is a diagram illustrating an example of a frame format of wireless transmission in the wireless communication system of the first embodiment.

Wireless transmission from the ground station 1 to the on-board station 2 and wireless transmission from the on-board station 2 to the ground station 1 are performed separately over time, that is, performed by time division. FIG. 8 is a diagram illustrating an example of a frame format of wireless transmission in the wireless communication system of the present embodiment. Each frame includes a plurality of time slots, and wireless devices in the system that perform transmission and reception are different for each slot. In the example of FIG. 8, the frame #i which is an i-th frame includes a broadcast information slot which is a slot for transmitting broadcast information from the ground station 1 to the train 3, n ground→on-board slots for transmission from the ground, that is, the ground station 1 to the train 3, that is, the on-board station 2, n on-board ground slots for transmission from the train 3, that is, the on-board station 2 to the ground, that is, the ground station 1, and an empty slot. Here, i is an integer of 0 or more indicating a frame number. n is the number of trains that can be connected to one ground station 1. That is, in an area covered by one ground station 1, it is possible to accommodate up to n trains simultaneously. The broadcast information includes frame numbers as described later. In FIG. 8, the broadcast information slot of the i-th frame is described as broadcast #i.

Regarding the n ground→on-board slots for transmission from the ground to the train 3, trains as destinations are different from each other, and regarding the n on-board-→ground slots for transmission from the train 3 to the ground, trains as sources are different from each other.

The broadcast information is information to be commonly transmitted from the ground station 1 to all the trains 3 in the area covered by the ground station 1. For example, the broadcast information includes information indicating which train is assigned to which slot, information of frame numbers, and the like. The empty slot is a period during which no wireless device in the system performs transmission. As will be described later, in the wireless communication system of the present embodiment, an interference amount is measured in the slot. By intentionally providing a period during which no wireless device performs transmission, that is, the empty slot as described above, it is possible to measure an interference signal, which is a radio signal of other system than the present system, accurately.

When the train 3 moves on the track 6 and reaches the vicinity of the boundary of an area covered by the ground station 1 being connected, a process of switching the ground station 1 to be connected, that is, a handover process is performed. For example, in FIG. 1, when the train 3 in a state of being connected to the ground station 1a moves in the right direction in FIG. 1 and reaches the vicinity of the boundary of an area covered by the ground station 1a, a handover process for switching the ground station 1 to which the train 3 is connected, from the ground station 1a to the ground station 1b, is performed. Any procedure may be used as a procedure of the handover process, and in general a procedure of a handover process performed in a wireless train control system can be used.

A time length of one frame is, for example, 500 ms. In that case, transmission from the on-board station 2 to the ground station 1 and transmission from the ground station 1 to the on-board station 2 are performed in a cycle of 500 ms. When the transmission from the on-board station 2 to the ground station 1 is stopped, the position of the train 3 cannot be grasped accurately. Accordingly, a train stop limit value of other train 3 is calculated assuming that the train 3 from which the transmission is stopped remains at a position corresponding to the latest position information transmitted by the train. In addition, when the transmission from the ground station 1 to the on-board station 2 is stopped, the stop limit position corresponding to each train 3 is not updated. Therefore, in the train 3, speed control and stop control of the train 3 are performed so that the train 3 does not reach the original stop limit position. In any case, the train 3 is controlled so that the train 3 is prevented from colliding with other train 3, although the train 3 stops at a position where the train 3 does not need to stop originally. For example, when the wireless transmission from the ground station 1 is stopped for three seconds, the on-board station 2 of the train 3 notifies the on-board control device 301 of that effect, and the on-board control device 301 performs control to stop the train 3 upon receiving the notification. That is, the above-described three seconds is a standby time determined in order to determine that the transmission information is unreachable in the on-board station. The number of packets transmitted during three seconds, that is, during the standby time is 3/0.5=6 in the example in which one frame is set to 500 ms. Accordingly, in that case, when the wireless transmission from the ground station 1 fails six times in a row, the on-board control device 301 stops the train 3. In other words, in order to avoid the unnecessary stop of the train 3 to achieve a stable system, it is desirable to maintain communication quality with which the wireless transmission will not fail six times in a row.

Generally, in the wireless communication system for controlling the train 3, the same control information may be transmitted a plurality of times, that is, consecutively transmitted. In such a case, even if the on-board station 2 fails to receive the control information once, no problem arises if the control information can be received while the same control information is being transmitted. It is desirable in such a case to maintain-communication quality with which the wireless transmission will not fail consecutively for the number of transmissions performed in the consecutive transmission.

In the wireless transmission between the on-board station 2 and the ground station 1, a frequency, that is, a frequency channel used may be switchable. In the case where the frequency channel is switchable, switching timing of the frequency channel may be notified from the ground station 1 to the on-board station 2 by broadcast information, or may be predetermined and information on the switching timing may be held by the ground station 1 and the on-board station 2. The following description will be given on the assumption that the frequency channel is switchable in the wireless transmission between the on-board station 2 and the ground station 1, and that when measuring a signal level and an interference level, the on-board station 2 and the ground station 1 associate these levels with a frequency channel. That is, the signal level and the interference level are measured for each frequency channel.

Next, an operation related to evaluation of the wireless communication quality of the present embodiment will be described. First, measurement of communication quality in the ground station 1 and generation of a communication quality database in the radio wave monitoring apparatus 4 will be described.

Figure 9:
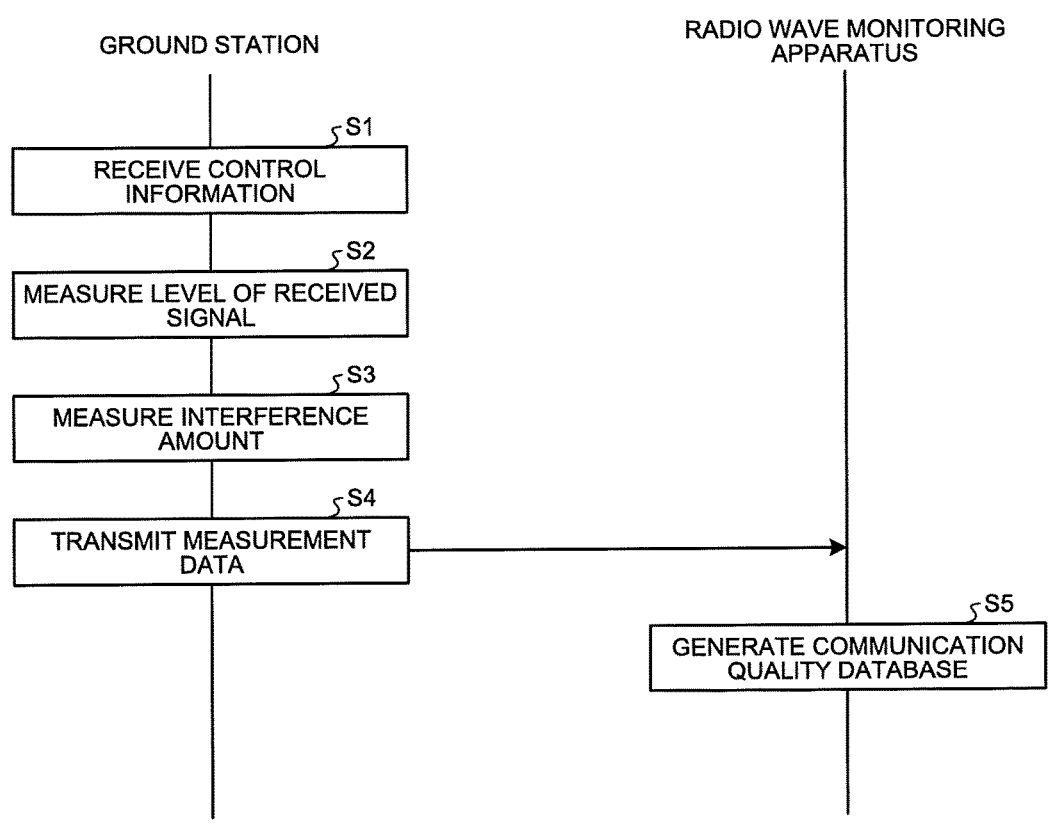
FIG. 9 is a chart illustrating an example of a procedure of measuring communication quality in the ground station and generating a communication quality database in the radio wave monitoring apparatus.

FIG. 9 is a chart illustrating an example of a procedure of measuring the communication quality in the ground station 1 and generating the communication quality database in the radio wave monitoring apparatus 4. In an on-board→ground slot, which corresponds to from the on-board station 2 to which the ground station 1 is connected to the ground station 1, the ground station 1 receives, from each on-board station 2 to which the ground station 1 is connected, control information including position information of the train 3 on which the on-board station 2 is mounted (Step S1).

In the ground station 1, the modulation/demodulation unit 103 demodulates and decodes a signal received via the antenna 101 and the RF unit 102, thereby restoring the transmitted control information. The control information is output from the modulation/demodulation unit 103 to the control unit 104. The level measurement unit 105 of the ground station 1 measures the level of the received signal of the control information received as a radio signal in the on-board→ground slot corresponding to the ground station 1 (Step S2).

The level measurement unit 105 of the ground station 1 measures the level of the received signal, that is, the interference amount in the empty slot (Step S3). When measuring an interference level, the level measurement unit 105 performs switching between the frequency channels in the empty slot at regular time intervals to measure the interference amount in each frequency channel. Here, an example will be described in which switching between the frequency channels is performed in the empty slot at regular time intervals and the interference amount in each frequency channel is measured. However, the interference amount may be measured in a single frequency channel in the empty slot without switching the frequency channel.

The level measurement unit 105 outputs measurement results in Steps S2 and S3 to the control unit 104. The control unit 104 holds the measurement result in Step S2 in association with the position information included in the control information output from the modulation/demodulation unit 103 and the frequency channel which has received the signal. When the measurement result in Step S2 is referred to as a signal level and the measurement result in Step S3 is referred to as an interference level, the control unit 104 holds the signal level associated with the position information and the frequency channel and the interference level associated with the frequency channel. That is, the signal level is a measurement result of the level of a signal received during a period during which the signal is predetermined to be transmitted in the on-board station 2 and the ground station 1, and the interference level is a measurement result of the level of a signal received in the empty slot which is a period during which the signal is predetermined not to be transmitted in the on-board station 2 and the ground station 1.

The control unit 104 transmits measurement data, that is, the signal level associated with the position information and the frequency channel described above and the interference level associated with the frequency channel to the radio wave monitoring apparatus 4 via the communication unit 106 and the wired network 5 (Step S4). That is, the ground station 1 transmits, to the radio wave monitoring apparatus 4, a first measurement result which is a measurement result obtained by measurement by the ground station 1 and a second measurement result which is a measurement result received from the on-board station 2. Transmission timing in Step S4 is arbitrary and transmission may be performed for each measurement data corresponding to one frame or may be performed in units of measurement data corresponding to a plurality of frames.

The radio wave monitoring apparatus 4 generates a communication quality database based on the measurement data received from each ground station 1 (Step S5). Specifically, the database generation unit 401 stores the signal level associated with the frequency channel and the position information as the communication quality database for each ground station based on the measurement data, and also stores the interference level for each ground station as the communication quality database. In the communication quality database, the signal levels and the interference levels are separately stored. That is, the database generation unit 401, which is a generation unit, performs an averaging process on the measurement data as measurement results received from the ground stations, and stores the measurement results after the averaging process as the communication quality database, which is communication quality information, in the storage unit 402.

Figure 10:
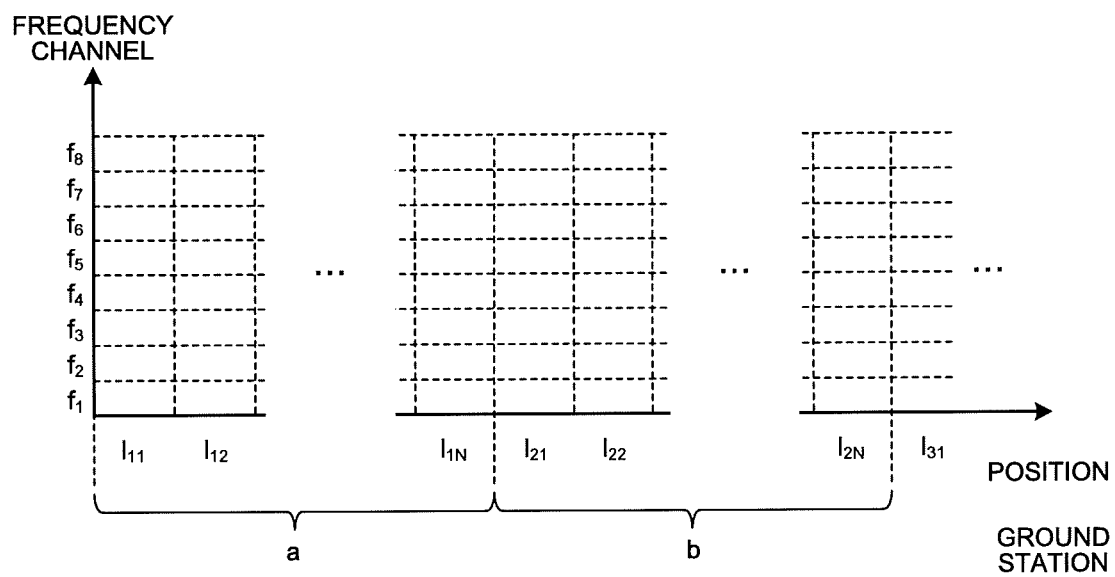
FIG. 10 is a diagram illustrating an example of a signal level storage format in the communication quality database of the first embodiment.

FIG. 10 is a diagram illustrating an example of a signal level storage format in the communication quality database of the present embodiment. In the example of FIG. 10, a configuration of a two-dimensional array of the position indicated by the position information and the frequency channel is employed. For an element of each array, a signal level corresponding thereto is stored. Each position illustrated in FIG. 10 indicates where the train 3, on which the on-board station 2 as a source of the signal to be measured is mounted, was traveling when the signal level was measured in each of the ground stations 1.

Reference characters "a" and "b" illustrated in FIG. 10 each indicate the ground station 1 as a source of the measurement data, and the reference characters "a" and "b" correspond to the ground stations 1a and 1b, respectively. In the example delineated in FIG. 10, an area corresponding to each ground station 1 is divided into N (N is an integer of 2 or more) sections. When an identification number indicating the ground station 1 is denoted by g, and the number of the section in the area of each ground station 1 is denoted by i, identification information indicating each section is denoted by $I_{gi}$. When the number of ground stations 1 is denoted by $N_g$, g is an integer from 1 to $N_g$, and i is an integer from 1 to N. In the example delineated in FIG. 10, the signal level is stored in the communication quality database in units of a section indicating a position.

Figure 11:
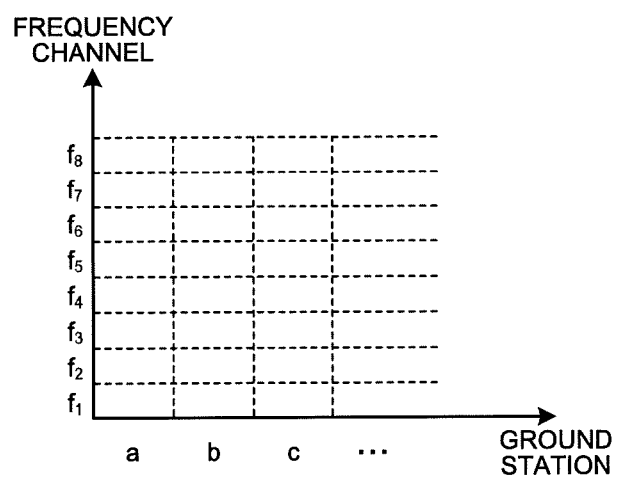
FIG. 11 is a diagram illustrating an example of an interference level storage format in the communication quality database of the first embodiment.

FIG. 11 is a diagram illustrating an example of an interference level storage format in the communication quality database of the present embodiment. Regarding the interference level, data is stored for each ground station. Similarly to FIG. 10, reference characters "a" and "b" illustrated in FIG. 11 each indicate the ground station 1 as a source of the measurement data, and the reference characters "a" and "b" correspond to the ground stations 1a and 1b, respectively.

The database generation unit 401 holds past measurement data for a certain period. Every time the database generation unit 401 receives new measurement data from the ground station 1, the database generation unit 401 calculates a moving average of measurement data corresponding to the same frequency channel and the same position, that is, the same section within the certain period including the new measurement data, regarding the signal level. Regarding the interference level, every time the database generation unit 401 receives new measurement data from the ground station 1, the database generation unit 401 calculates a moving average of measurement data corresponding to the same ground station 1 within the certain period, including the new measurement data. Then, the moving average of the signal level is stored in the communication quality database in the format exemplified in FIG. 10, and the moving average of the interference level is stored in the communication quality database in the format exemplified in FIG. 11.

Alternatively, the database generation unit 401 may perform averaging using a forgetting factor instead of the moving average. For example, when a value of the database before update is denoted by $y_j$ and new measurement data is denoted by $x_{j+1}$, the database generation unit 401 calculates an updated value $y_{j+1}$ by the following formula (1). a is a forgetting factor and is a value in a range of from 0 to 1. For example, α is predetermined. α may be updatable.

$$y_{j+1} = (1-\alpha)y_j + \alpha x_{j+1} \quad (1)$$

With the above operation, the communication quality database relating to the transmission of data from the on-board station 2 to the ground station 1 is generated in the radio wave monitoring apparatus 4.

Next, the measurement of the communication quality in the on-board station 2 and the generation of the communication quality database in the radio wave monitoring apparatus 4 will be described. The basic operation is similar to that in the measurement of the communication quality in the ground station 1. That is, first, operations similar to those in the Steps S1 to S3 illustrated in FIG. 9 are performed in the on-board station 2. However, timing at which the on-board station 2 measures the signal level is a ground, on-board slot corresponding to the on-board station 2. In the on-board station 2, the control unit 204 acquires the position of the train 3 when measuring the signal level from the position detection unit 302, and holds the signal level in association with the position information and the frequency channel. With respect to the interference level, the on-board station 2 performs measurements in the empty slot similarly to the ground station 1. In the on-board station 2, the control unit 204 acquires the position of the train 3 when measuring the interference level from the position detection unit 302, and holds the interference level in association with the position information and the frequency channel.

The on-board station 2 transmits the signal level and the interference level each associated with the position information and the frequency channel as measurement data to the ground station 1. As a method for transmitting the measurement data as the second measurement result from the on-board station 2 to the ground station 1, the on-board station 2 may transmit the measurement data to the ground station 1 by using the on-board the ground slot, or the on-board station 2 may accumulate the measurement data in the on-board station 2 to collectively transmit the measurement data to the ground station 1 during non-operation hours such as at night. Alternatively, a wireless device different from the wireless device transmitting the control information may be separately installed in each of the ground station 1 and the train 3, and the measurement data may be transmitted from the train 3 to the ground station 1 by using these wireless devices. The on-board station 2 may accumulate measurement data for a certain period, calculate an average value of the measurement data for the certain period for each measurement position, and transmit the average value along with the number of measurements to the ground. In that case, since an amount of data to be transmitted is reduced as compared with a case where all the measurement data are transmitted from the on-board station 2 to the ground station 1, radio bands to be used can be reduced. As described with reference to FIG. 10, the measurement position can be managed on a section basis.

The ground station 1 transmits the measurement data received from the on-board station 2 to the radio wave monitoring apparatus 4. The database generation unit 401 of the radio wave monitoring apparatus 4 performs averaging using the moving average or forgetting factor for each of the signal level and the interference level, similarly to the process on the measurement data measured by the ground station 1, and stores a processed value in the communication quality database. Similarly to the signal level, the interference level measured by the on-board station 2 is stored in association with the position information and the frequency channel. Here, the interference level measured by the on-board station 2 is stored in association with the position information and the frequency channel. However, similarly to the interference level measured by the ground station 1, the interference level measured by the on-board station 2 may be stored in association with the frequency channel, and in no association with the position information.

Through the above operation, the total of four kinds of communication qualities of the signal level and the interference level based on the measurement results measured in the ground station 1, as well as the signal level and the interference level based on the measurement results measured in the on-board station 2 are stored in the communication quality database. Hereinafter, the signal level and the interference level based on the measurement results measured in the ground station 1 are referred to as the signal level and the interference level in the ground station 1, respectively, and the signal level and interference level based on the measurement results measured in the on-board station 2 are referred to as the signal level and the interference level in the on-board station 2, respectively. The signal level and the interference level based on the measurement results measured in the ground station 1 are collectively referred to as communication quality in the ground station 1, and the signal level and the interference level based on the measurement results measured in the on-board station 2 are collectively referred to as communication quality in the on-board station 2.

Figure 12:
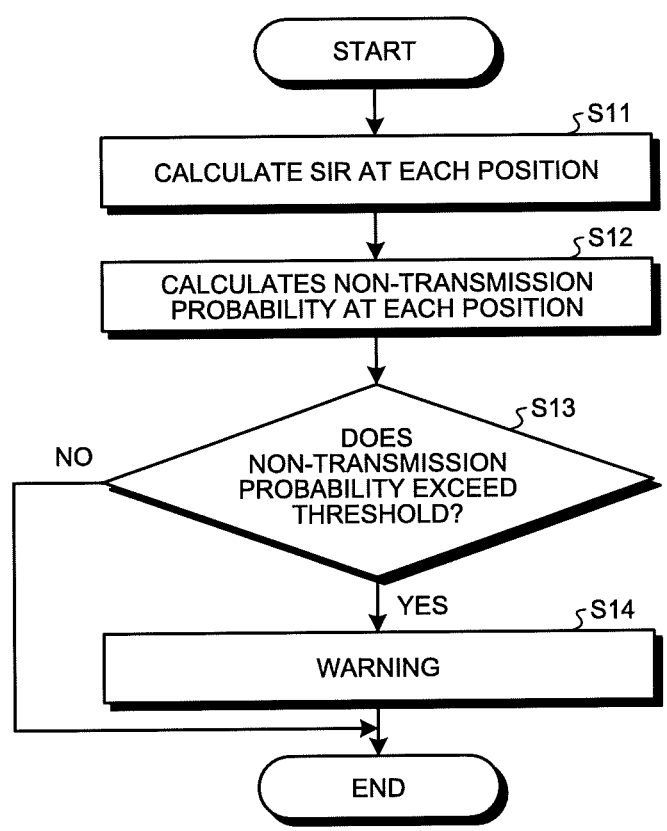
FIG. 12 is a flowchart illustrating an example of a processing procedure in a communication quality evaluation unit of the first embodiment.

Next, an operation of the communication quality evaluation unit 403 in the radio wave monitoring apparatus 4 will be described. FIG. 12 is a flowchart illustrating an example of a processing procedure in the communication quality evaluation unit 403 of the present embodiment. The communication quality evaluation unit 403 performs a process illustrated in FIG. 12 for each ground station 1. First, the communication quality evaluation unit 403 calculates a signal to interference power ratio (SIR) at each position based on the signal levels and the interference levels stored in the communication quality database (Step S11). Specifically, the communication quality evaluation unit 403 calculates the SIR for each of transmission from the ground station 1 to the on-board station 2 and transmission from the on-board station 2 to the ground station 1, by using the following formula (2). When extracting the signal level and the interference level stored in the communication quality database, data corresponding to the frequency channel being used in each wireless link is extracted.

$$SI_i = S_i / D_i \quad (2)$$

In the formula (2), $SI_i$ is the SIR at a position i. $S_i$ is a signal level at the position i extracted from the communication quality database. $D_i$ is an interference level at the position i extracted from the communication quality database. The position i corresponds to i in the identification information $I_{gi}$ indicating a section as described in FIG. 10. Regarding the interference level in the transmission from the on-board station 2 to the ground station 1, since the interference level is determined in units of ground station 1, the same value is obtained for the same ground station 1 regardless of the position of the train 3.

Then, the communication quality evaluation unit 403 calculates a non-transmission probability $Q_{mes}$ at each position from the calculated $SI_i$ by the following formula (3) (Step S12).

$$Q_{mes} = (P(SI_i))^L i = 1 \text{ to } N \quad (3)$$

Figure 13:
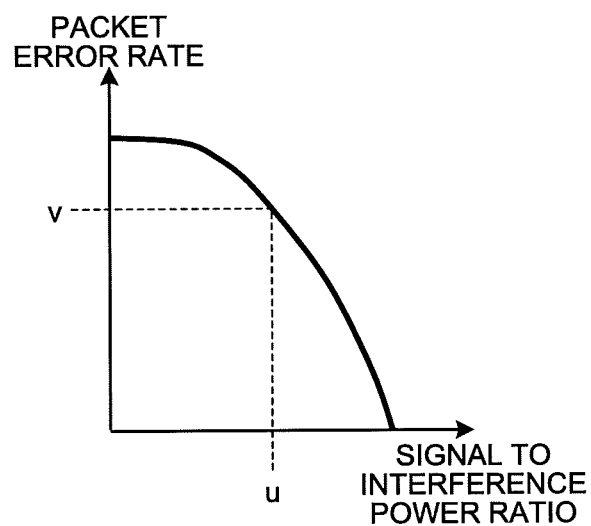
FIG. 13 is a diagram illustrating an example of P(q) of the first embodiment.

Here, P(q) is a packet error rate when SIR is q. FIG. 13 is a diagram illustrating an example of P(q). In the example illustrated in FIG. 13, the packet error rate is v when the SIR is u. P(q) is obtained in advance by simulation or the like, for example.

L is one of conditions for determining that the control information is not transmitted, that is, conditions by which it is determined that the transmission information is unreachable in the wireless communication between the ground station 1 and the on-board station 2, and is information indicating the number of times the transmission information cannot be received in a row, the number being a criterion of whether it is determined that the transmission information is not transmitted. That is, $Q_{mes}$ indicated by the formula (3) indicates a probability that the received packet is erroneous L times in a row. A packet is a block of transmission data, and here, one packet is transmitted in each slot exemplified in FIG. 8. As described above, in the case where it is determined that the control information is unreachable in three seconds assuming that one frame is 500 ms, it is determined that the control information is unreachable when the packet is erroneous six times in a row, and therefore, L=6. In a case of performing the consecutive transmission described above, the number of consecutive transmissions may be used as L. In any case, L is information indicating a condition by which it is determined that the control information is unreachable in the wireless communication system 800.

Returning to the description of FIG. 12, the communication quality evaluation unit 403 determines whether the calculated non-transmission probability of each position exceeds a predetermined threshold (Step S13), and when there is at least one position where the non-transmission probability exceeds the threshold (Step S13 Yes), the communication quality evaluation unit 403 gives a warning for notifying degradation of the communication quality of the wireless communication (Step S14), that is, notifies the degradation of the communication quality of the wireless communication, and ends the process. When there is no position where the non-transmission probability exceeds the threshold (Step S13 No), the communication quality evaluation unit 403 ends the process. As a process of giving the warning in Step S14, any process may be performed, for example, a process of sending an alarm to the operation control device (not illustrated) may be considered. The communication quality evaluation unit 403 may perform the process in FIG. 12, for example, on the ground station 1 corresponding to updated data when at least a part of data in the communication quality database is updated, or may perform the process in FIG. 12 on all ground stations 1 on a regular basis.

As described above, the communication quality evaluation unit 403 as an evaluation unit notifies degradation of communication quality of wireless communication when the non-transmission probability exceeds the threshold, the non-transmission probability having been calculated based on the measurement results of the communication quality of the wireless communication between the on-board station 2 and the ground stations 1, and the condition by which it is determined that the transmission information is unreachable in the wireless communication.

When it is determined in Step S13 that the non-transmission probability exceeds the threshold, the non-transmission probability may be similarly calculated based on data of other frequency channels, and may be used as an indicator when changing the frequency channel used. For example, the frequency channel used is switched to an arbitrary one of other frequency channels whose non-transmission probability is equal to or less than the threshold.

In the above, the example has been described in which the frequency channel in the wireless transmission between the ground station 1 and the on-board station 2 can be switched.

However, when the frequency channel in the wireless transmission between the ground station 1 and the on-board station 2 is fixed, a process depending on the frequency channel in the above-described operation is not performed. Accordingly, for example, the signal level in the ground station 1 stored in the communication quality database is not associated with the frequency channel, and is associated with the position information. The interference level in the ground station 1 stored in the communication quality database is not associated with the frequency channel, and is associated with the ground station 1.

In an area including a position where the non-transmission probability exceeds the threshold, the number of trains to be accommodated may be reduced and the same train may be allocated to a slot thus emptied. In that case, the radio wave monitoring apparatus 4 notifies the ground station 1 in which the non-transmission probability exceeds the threshold that the non-transmission probability exceeds the threshold together with information indicating the position where the threshold is exceeded. In the ground station 1, the number n of trains to be accommodated is reduced, that is, the number of ground→on-board slots and the number of on-board→ground slots in one frame exemplified in FIG. 8 are each reduced to increase an empty slot. Then, the increased empty slot is allocated to the slot of the on-board station 2 mounted on the train 3 present in the position, that is, the section where the non-transmission probability exceeds the threshold. The ground station 1 can grasp the position of each train 3 by the control information received from the on-board station 2. By reducing the number of trains to be accommodated and allocating a plurality of slots per frame to the same ground station 1 and the same on-board station 2 as described above, the number of packets transmitted per unit time increases. Therefore, the number of L's in formula (3) can be increased, and the non-transmission probability can be reduced.

Figure 14:
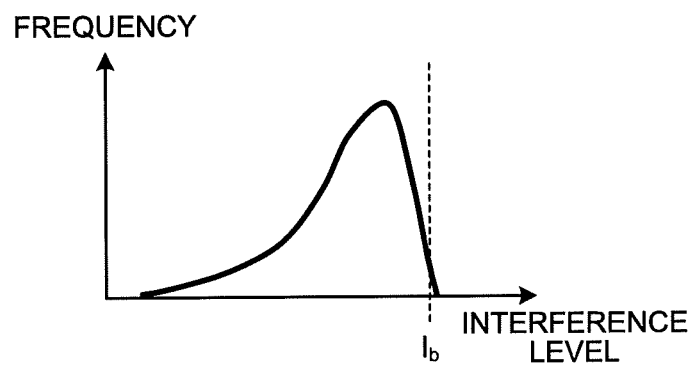
FIG. 14 is a diagram illustrating an example of frequency for each interference level in the first embodiment.

The interference level in the communication quality database may be stored in a histogram employing the level as a class. For example, as illustrated in FIG. 14, frequency for each measured interference level is obtained and stored as the interference level in the communication quality database. FIG. 14 is a diagram illustrating an example of the frequency for each interference level. In that case, when calculating the non-transmission probability, for example, a level at which 99% of the measured values are equal to or less than the value, i.e. $I_b$ illustrated in FIG. 14 is used as the interference level. Consequently, it becomes possible to consider interference sources which emit large interference less frequently. In that case, if the on-board station 2 creates a histogram based on the measurement data in the on-board station 2 and transmits the measurement data to the ground as the histogram, it is possible to reduce the radio bands used.

Figure 15:
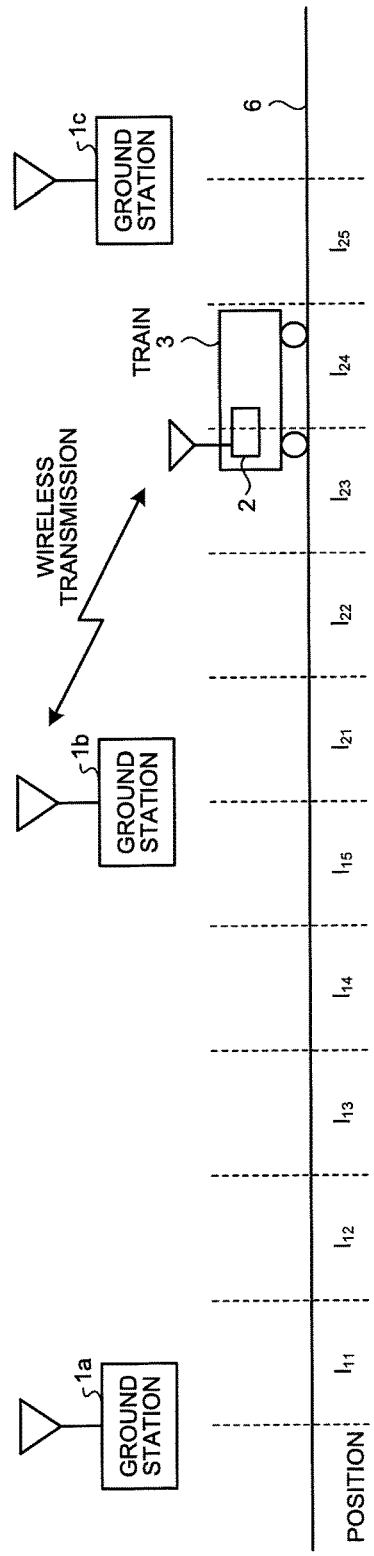
FIG. 15 is a diagram illustrating an example of a positional relationship between the train and the ground stations of the first embodiment.

When calculating the non-transmission probability, the communication quality evaluation unit 403 may assume a case of breakdown of the ground station 1 to which the on-board station 2 is connected, and may calculate the non-transmission probability, for each position, when the ground station 1 adjacent to the ground station 1 corresponding to the position and the on-board station 2 of the train 3 present at the position are connected. That is, the communication quality evaluation unit 403 may calculate the non-transmission probability in wireless communication between the on-board station 2 and a second ground station which is the ground station 1 adjacent to a first ground station which is the ground station 1 normally connected to the on-board station 2. FIG. 15 is a diagram illustrating an example of the positional relationship between the train 3 and the ground stations 1. For example, when the train 3 is positioned in the sections $I_{21}$ to $I_{25}$ illustrated in FIG. 15, normally, the on-board station 2 of the train 3 is connected to the ground station 1b, and the non-transmission probability corresponding to the on-board station 2 is calculated based on the measurement data in the wireless transmission with the ground station 1b. Since the on-board station 2 does not actually communicate with the ground station 1a adjacent to the ground station 1b at a position in the sections $I_{21}$ to $I_{25}$, the on-board station 2 does not measure a signal level in the wireless transmission with the ground station 1a. Therefore, a value obtained by subtracting a value corresponding to a propagation loss during transmission between the ground station 1a and the ground station 1b from the signal level measured by the on-board station 2 positioned in the sections $I_{21}$ to $I_{25}$ in the wireless transmission with the ground station 1b is used as a signal level in the transmission with the ground station 1a. As the value corresponding to the propagation loss, for example, a value calculated based on a free space propagation loss corresponding to a distance between two ground stations may be used, or a value measured in transmission performed beforehand between the ground stations may be used. As a result, in a case of breakdown of the ground station 1 to which the on-board station 2 is connected, the on-board station 2 can take countermeasures against the breakdown in consideration of the communication quality in a case where the on-board station 2 is connected to the ground station 1 adjacent to the ground station 1 which has broken down.

As described above, according to the wireless communication system of the present invention, the non-transmission probability of the control information within a certain period is calculated based on the signal level and the interference level measured for each position of the train 3, and the communication quality is evaluated based on the non-transmission probability. That is, in the wireless communication system of the present embodiment, a communication quality monitoring method is performed, the method including a first step of measuring a measurement result of communication quality of wireless communication between the on-board station 2 and the ground stations 1, a second step of calculating a non-transmission probability based on a condition by which it is determined that transmission information is unreachable in the wireless communication, and a third step of notifying degradation of communication quality of the wireless communication when the non-transmission probability exceeds a threshold. Therefore, it is possible to appropriately evaluate the probability that control information is not correctly transmitted, and to achieve a stable wireless communication system. In addition, since the non-transmission probability is calculated based on the condition by which it is actually determined in the train 3 that the control information is unreachable, such as a condition by which it is determined that the control information is unreachable and the train 3 is controlled to stop, it is possible to surely grasp a position which does not satisfy the communication quality required for the wireless communication system.

Second Embodiment

Figure 16:
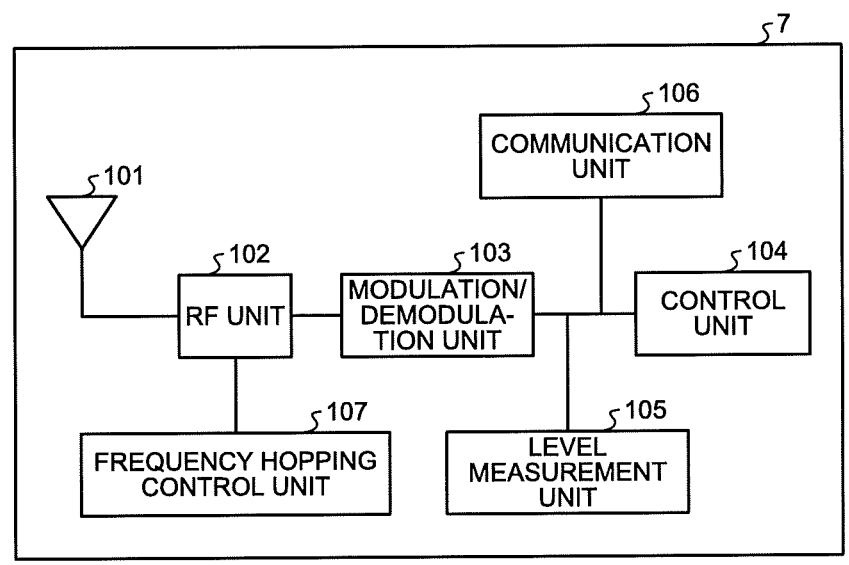
FIG. 16 is a diagram illustrating a configuration example of a ground station of a second embodiment.
Figure 17:
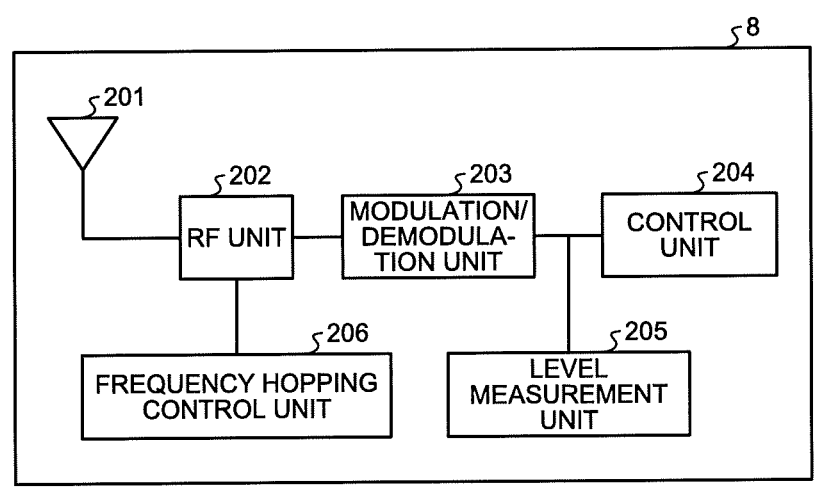
FIG. 17 is a diagram illustrating a configuration example of an on-board station of the second embodiment.

Next, a wireless communication system of a second embodiment according to the present invention will be described. The wireless communication system of the present embodiment performs frequency hopping for switching frequencies used at regular time intervals in wireless transmission between a ground station and an on-board station. FIG. 16 is a diagram illustrating a configuration example of the ground station 7 of the second embodiment. FIG. 17 is a diagram illustrating a configuration example of the on-board station 8 of the second embodiment. The wireless communication system of the present embodiment is similar to the wireless communication system of the first embodiment except that the ground station 7 and the on-board station 8 are included instead of the ground station 1 and the on-board station 2 in the wireless communication system illustrated in FIG. 1, respectively. Constituent elements having functions similar to those in the first embodiment are denoted by the same reference numerals as those in the first embodiment, and overlapping descriptions will be omitted. Hereinafter, portions different from those in the first embodiment will be described.

Figure 18:
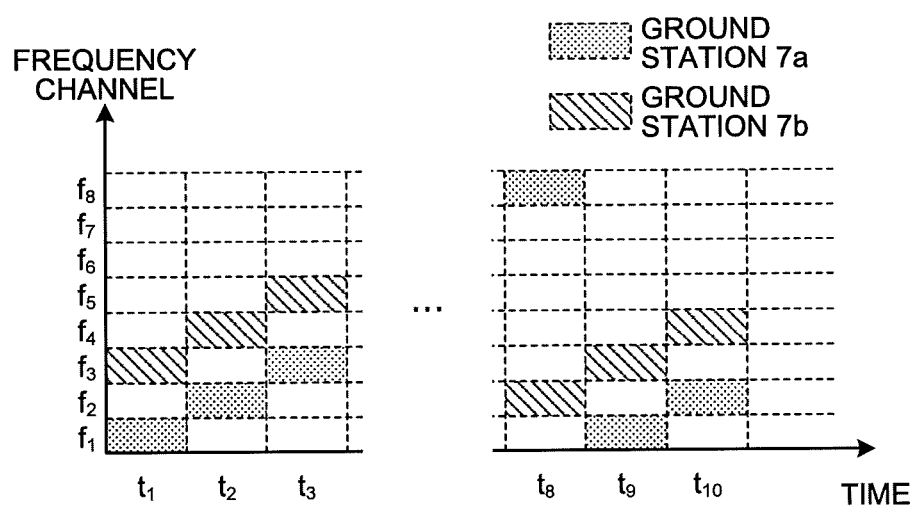
FIG. 18 is a diagram illustrating an example of a frequency used for wireless transmission between the ground stations and the on-board station of the second embodiment.

As illustrated in FIG. 16, the ground station 7 of the present embodiment has a configuration obtained by adding a frequency hopping control unit 107 to the ground station 1 of the first embodiment. As illustrated in FIG. 17, the on-board station 8 of the present embodiment has a configuration obtained by adding a frequency hopping control unit 206 to the on-board station 2 of the first embodiment. The frequency hopping control units 107 and 206 perform a control to switch frequencies used for transmission and reception at regular time intervals. FIG. 18 is a diagram illustrating an example of the frequencies used for wireless transmission between the ground stations and the on-board station of the present embodiment. In the example illustrated in FIG. 18, eight frequency channels $f_1$ to $f_8$ are used. In the example illustrated in FIG. 18, when a frequency channel of $f_h$ is referred to as an h-th frequency channel, the frequency channel is switched at regular time intervals to a frequency channel whose number is one larger than that of the frequency channel previously used. Accordingly, a hopping pattern in the example illustrated in FIG. 18 includes eight switching operations as one unit. There is a shift equivalent to two frequency channels between a hopping pattern corresponding to a ground station 7a and a hopping pattern corresponding to a ground station 7b. The hopping pattern used for frequency hopping and the number of frequency channels used for frequency hopping are not limited to the example of FIG. 18.

FIG. 18 illustrates frequencies used by the ground station 7a for communication with the on-board station 8 and frequencies used by the ground station 7b for communication with the on-board station 8. As illustrated in FIG. 18, the ground stations 7a and 7b are adjacent ground stations 7, and use frequency channels different from each other at the same time point. While the adjacent ground stations 7 use frequency channels different from each other at the same time point as described above, each ground station 7 switches the frequency used for communication with the on-board station 8 at regular time intervals. The switching pattern of the frequency as illustrated in FIG. 18, that is, the hopping pattern may be predetermined and held by the ground stations 7 and the on-board station 8, for example, or the ground stations 7 each may notify the on-board station 8 to which the ground station 7 is connected of the hopping pattern by broadcast information or the like. The unit in which the frequencies are switched, that is, the above-described certain period of time is, for example, one frame, but it is not limited thereto and may be one slot.

The frequency hopping control units 107 and 206 may be achieved as the processing circuit 900 which is dedicated hardware as illustrated in FIG. 6, or may be achieved by the control circuit 901 illustrated in FIG. 7. Since the specific content of the frequency hopping control is similar to that of general frequency hopping control, a detailed description thereof will be omitted.

In the present embodiment, the radio wave monitoring apparatus 4 generates a communication quality database and calculates a non-transmission probability using the communication quality database similarly to the first embodiment. However, the radio wave monitoring apparatus 4 calculates the non-transmission probability based on the communication quality in each channel used for frequency hopping. When the frequency hopping is performed, the frequency channel to be used for wireless communication is determined by information for identifying a hopping pattern to be used and a sequence number which is information indicating a position of a time zone in the hopping pattern. The radio wave monitoring apparatus 4 holds the hopping pattern corresponding to each ground station 7 and calculates the non-transmission probability using the hopping pattern corresponding to each ground station 7. Specifically, the non-transmission probability is calculated as follows. The frequency channel to be used is determined depending on the sequence number indicating the position of the time zone in the hopping pattern. Here, a frequency channel of a sequence number β in the hopping pattern is described as f(β). When a sequence number at a certain reference time is denoted by j, and the number of time zones constituting one hopping pattern, that is, the maximum value of the sequence number is denoted by M, a sequence number of a k-th reference time after the certain reference time is mod(j+k, M). Here, mod(A,B) is the remainder when A is divided by B. Accordingly, when the signal to interference power ratio at a frequency f and the position i is $SI_{if}$, the communication quality evaluation unit 403 calculates $Q_{mes}$ which is a probability that a packet is erroneous L times in a row, from the time zone, that is, the slot corresponding to the sequence number j+1, by the following formula (4). When j is unknown, the non-transmission probability is calculated for each j from 1 to M by the formula (4), and an average value, a maximum value, or the like thereof may be used as the non-transmission probability.

[Formula 1]

$$Q_{mes} = \prod_{k=1}^{L} P(SI_{if(mod(j+k,M))}) \qquad (4)$$

$$i = 1 \sim N, \ j = 1 \sim M$$

i=1 to N, j=1 to M

In the present embodiment, the communication quality evaluation unit 403 calculates $Q_{mes}$ by the formula (4) and determines whether $Q_{mes}$ exceeds a $Q_{mes}$ threshold similarly to the first embodiment. Although the formula (4) indicates a case where the frequency channels are switched on frame-by-frame basis, when frequency channels are switched on slot-by-slot basis, mod(j+k×K,M) can be used instead of mod(j+k,M) in formula (4). K is the number of slots corresponding to transmission intervals of packets having the same combination of the transmitting station and the receiving station. When $Q_{mes}$ exceeds the threshold, a warning is given together with information indicating a position, a transmission direction, and a frequency channel corresponding thereto. The operations of the present embodiment other than those described above are similar to those in the first embodiment. For example, a configuration may be employed in which a hopping sequence of frequency hopping is changed in each ground station 7 based on a calculation result of the non-transmission probability. That is, the hopping pattern for each ground station 7 may be determined based on the non-transmission probability.

As described above, according to the wireless communication system of the present invention, it is possible to appropriately evaluate a probability that control information is not correctly transmitted even in the case of performing wireless transmission using frequency hopping, and thereby a stable wireless communication system can be achieved.

Third Embodiment

Figure 19:
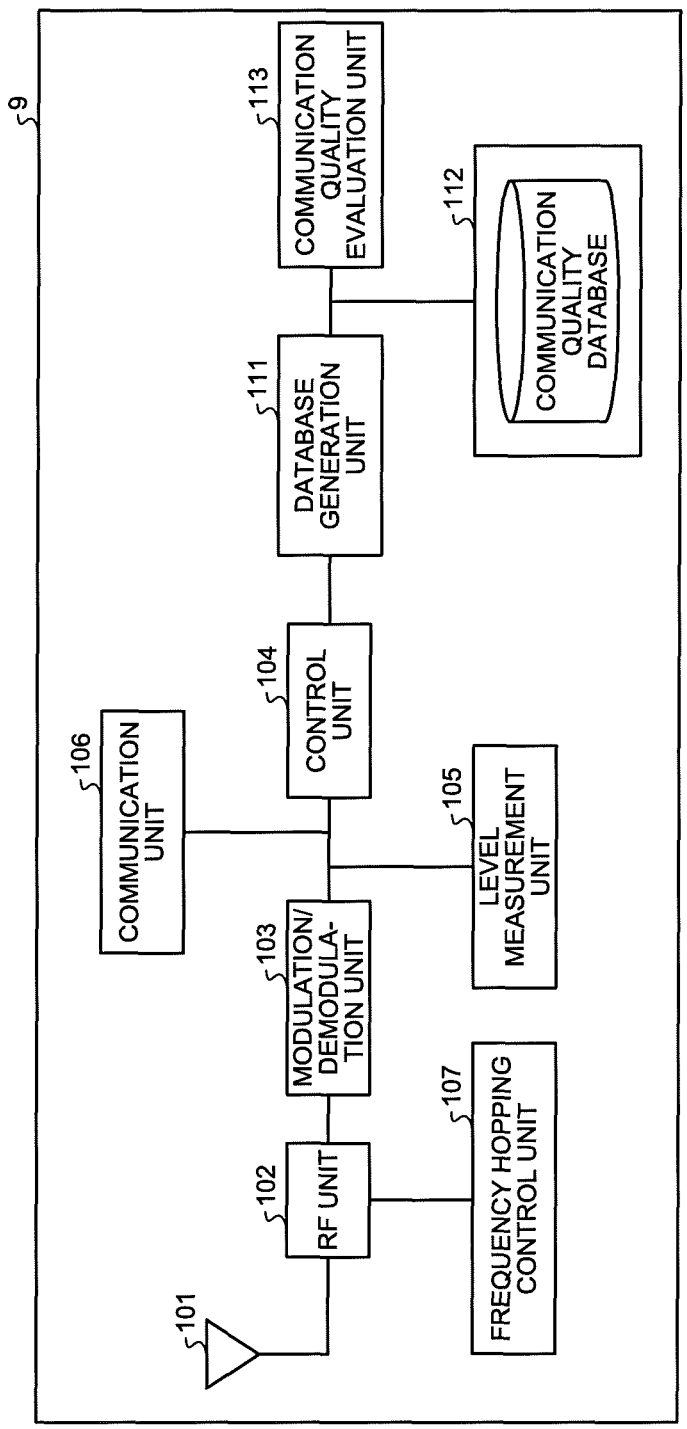
FIG. 19 is a diagram illustrating a configuration example of a ground station of a third embodiment.
Figure 20:
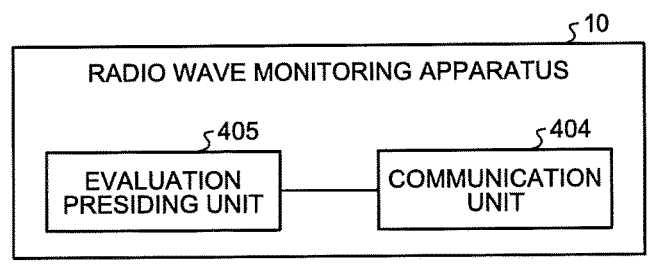
FIG. 20 is a diagram illustrating a configuration example of a radio wave monitoring apparatus of the third embodiment.

Next, a wireless communication system of a third embodiment according to the present invention will be described. FIG. 19 is a diagram illustrating a configuration example of a ground station 9 of the present embodiment. FIG. 20 is a diagram illustrating a configuration example of a radio wave monitoring apparatus 10 of the present embodiment. The wireless communication system of the present embodiment is similar to the wireless communication system of the second embodiment except that the ground station 9 is included instead of the ground station 7 of the second embodiment and the radio wave monitoring apparatus 10 is included instead of the radio wave monitoring apparatus 4 of the second embodiment. Constituent elements having functions similar to those in the second embodiment are denoted by the same reference numerals as those in the first embodiment, and overlapping descriptions will be omitted. Hereinafter, portions different from those in the second embodiment will be described.

As illustrated in FIG. 19, the ground station 9 of the present embodiment is similar to the ground station 7 of the second embodiment except that a database generation unit 111, a communication quality evaluation unit 113 as an evaluation unit, a storage unit 112 which stores a communication quality database are added to the ground station 7 of the second embodiment. As illustrated in FIG. 20, the radio wave monitoring apparatus 10 of the present embodiment includes the communication unit 404 similar to that of the first embodiment and an evaluation presiding unit 405 as an evaluation unit.

In the present embodiment, each ground station 9 holds the communication quality database dispersed thereto and calculates a non-transmission probability of each position based on the communication quality database. An operation of the database generation unit 111 is similar to the operation of the database generation unit 401 of the first embodiment, but the database generation unit 111 stores a signal level and an interference level corresponding to the ground station 9 as the communication quality database. An operation of the communication quality evaluation unit 113 is to calculate the non-transmission probability of each position in an area covered by the ground station 9 based on the communication quality database. The communication quality evaluation unit 113 outputs the non-transmission probability of each position to the communication unit 106, and the communication unit 106 transmits the non-transmission probability of each position to the radio wave monitoring apparatus 10 via the wired network 5.

The evaluation presiding unit 405 of the radio wave monitoring apparatus 10 compares the non-transmission probability for each position calculated by each ground station 9 received via the communication unit 404 with a threshold. When the non-transmission probability exceeds the threshold, a warning is given together with information indicating a position, a transmission direction, and a frequency channel corresponding thereto.

In the above description, the example has been illustrated in which the communication quality database is dispersed to each ground station when performing frequency hopping. However, the communication quality database may be similarly dispersed to each ground station, when the frequency hopping is not performed. In that case, the database generation unit 111, the communication quality evaluation unit 113, and the storage unit 112 of the present embodiment are added to the ground station 1 of the first embodiment. Then, the radio wave monitoring apparatus 10 receives the non-transmission probability of each position from each ground station, and performs comparison with a threshold similarly to the above example.

As described above, according to the wireless communication system of the present invention, a configuration is employed in which the communication quality database is dispersedly arranged to each base station, the non-transmission probability is calculated, and the result is aggregated in the radio wave monitoring apparatus to perform determination. Therefore, the configuration of the radio wave monitoring apparatus can be simplified, and a stable wireless communication system can be more easily achieved.

Fourth Embodiment

Figure 21:
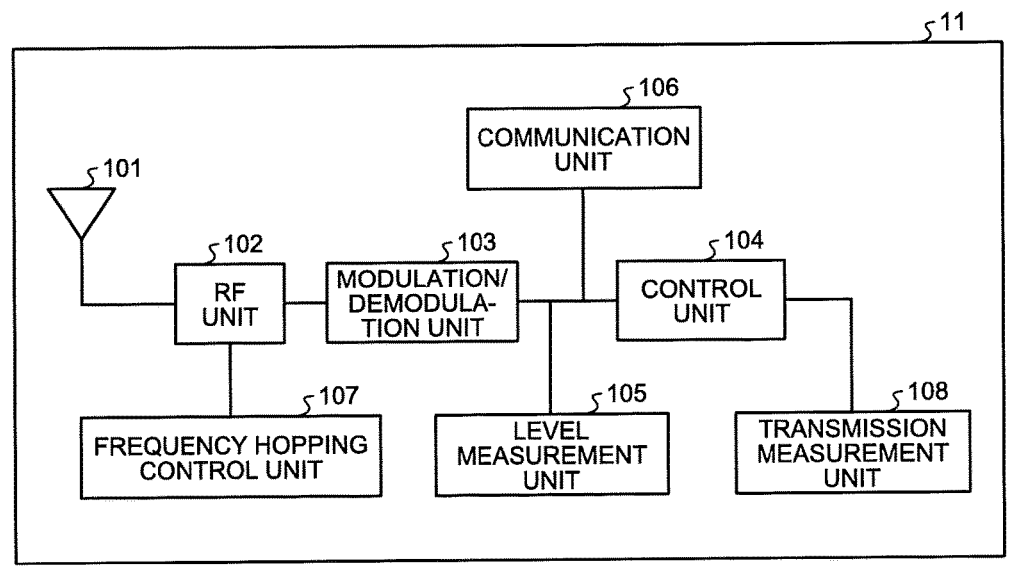
FIG. 21 is a diagram illustrating a configuration example of a ground station of a fourth embodiment.
Figure 22:
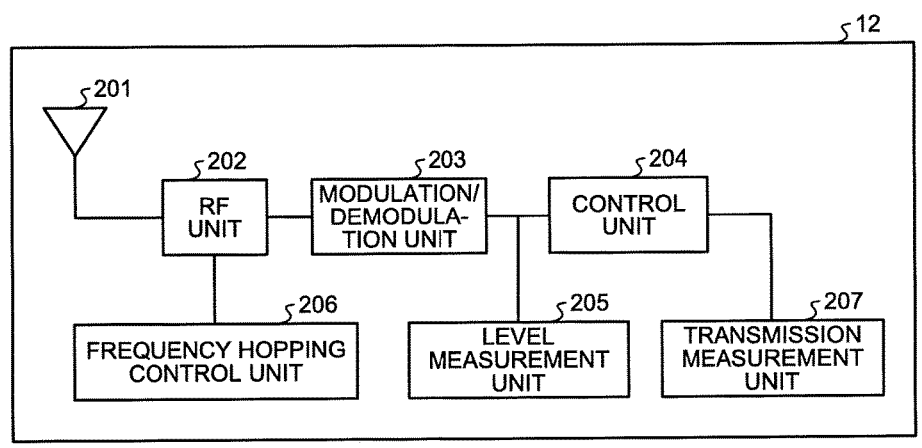
FIG. 22 is a diagram illustrating a configuration example of an on-board station of the fourth embodiment.

Next, a wireless communication system of a fourth embodiment according to the present invention will be described. FIG. 21 is a diagram illustrating a configuration example of a ground station 11 of the present embodiment. FIG. 22 is a diagram illustrating a configuration example of an on-board station 12 of the present embodiment. The wireless communication system of the present embodiment is similar to the wireless communication system of the second embodiment except that the ground station 11 is included instead of the ground station 7 of the second embodiment and the on-board station 12 is included instead of the on-board station 8 of the second embodiment. Constituent elements having functions similar to those in the second embodiment are denoted by the same reference numerals as those in the first embodiment, and overlapping descriptions will be omitted. Hereinafter, portions different from those in the second embodiment will be described.

As illustrated in FIG. 21, the ground station 11 of the present embodiment is similar to the ground station 7 of the second embodiment except that a transmission measurement unit 108 is added to the ground station 7 of the second embodiment. As illustrated in FIG. 22, the on-board station 12 of the present embodiment is similar to the on-board station 8 of the second embodiment except that a transmission measurement unit 207 is added to the on-board station 8 of the second embodiment. In the present embodiment, the transmission measurement units 108 and 207 calculate, as communication quality, an actual transmission result of control information, that is, the number of actually transmitted packets and the number of packets with an error caused. That is, in the present embodiment, in addition to a signal level and an interference level, the number of transmission packets which is the number of packets transmitted in wireless communication and the number of error packets which is the number of packets determined to have an error among the transmission packets are included as the measurement result of the radio quality. Then, the radio wave monitoring apparatus 4 evaluates a non-transmission probability while reflecting the transmission result.

When receiving the control information, the transmission measurement units 108 and 207 store the number of pieces of control information received, that is, the number of received packets, that is, the number of transmission packets, and the number of packets determined to be erroneous. For error determination, it is possible to use an error determination result obtained at the time of decoding by the modulation/demodulation unit 103 or the modulation/demodulation unit 203. The transmission measurement units 108 and 207 receive the error determination result of each packet from the modulation/demodulation unit 103 or the modulation/demodulation unit 203 via the control unit 104 or the control unit 204, and hold the number of pieces of control information received, that is, the number of received packets and the number of packets determined to be erroneous as a transmission result. The held transmission result is associated with position information and a frequency channel similarly to measurement data. Similarly to the measurement data, the ground station 11 transmits the transmission result associated with the position information and the frequency channel to the radio wave monitoring apparatus 4. Similarly to the measurement data, the on-board station 12 transmits the transmission result associated with the position information and the frequency channel to the ground station 11, and the ground station 11 transmits the transmission result received from the on-board station 12 to the radio wave monitoring apparatus 4.

Figure 23:
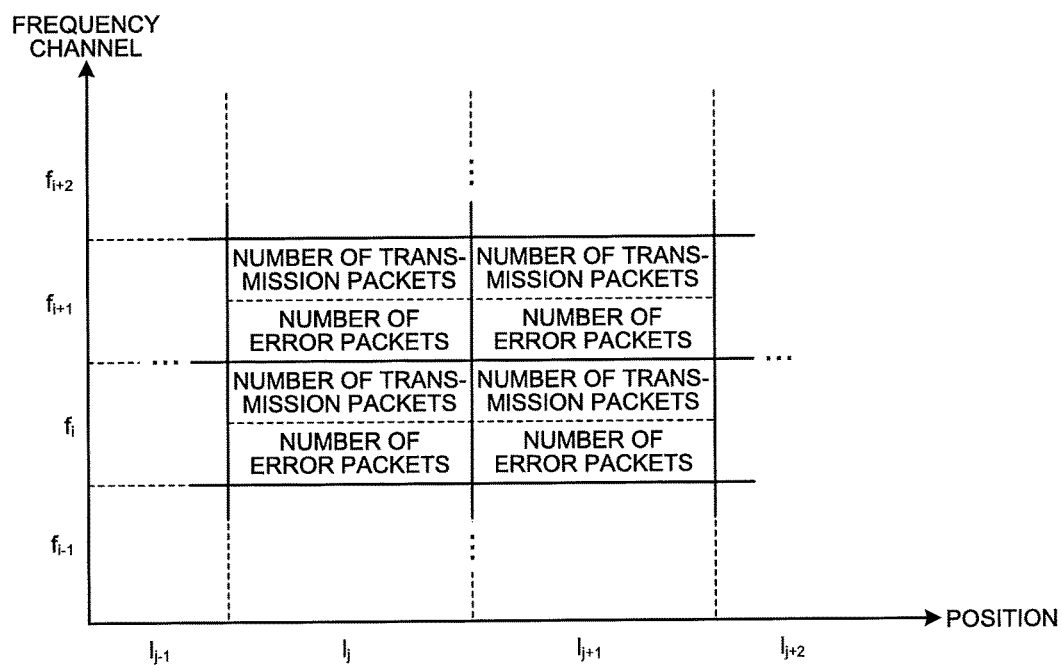
FIG. 23 is a diagram illustrating an example of transmission results of the fourth embodiment.

FIG. 23 is a diagram illustrating an example of transmission results of the present embodiment. As illustrated in FIG. 23, in the ground station 11 and the on-board station 12, the number of transmission packets and the number of error packets of each position and frequency channel are held.

In the present embodiment, the database generation unit 401 of the radio wave monitoring apparatus 4 also stores the transmission result in the communication quality database in association with the position information and the frequency channel, similarly to the signal level.

The communication quality evaluation unit 403 of the radio wave monitoring apparatus 4 calculates the non-transmission probability similarly to the second embodiment. However, in a case where a number of data are accumulated in the communication quality database as the transmission result, the number of which being equal to or larger than a predetermined threshold, that is, in a case where the number of transmission packets is equal to or larger than the threshold, the communication quality evaluation unit 403 calculates the non-transmission probability using the transmission result for the communication quality database. That is, with the use of a transmission result of a corresponding position and frequency channel instead of the packet error rate $P(SI_{ij})$ in the formula (4), a packet error rate $P_e$ is calculated by the following formula (5), and is used.

$$P_e = \text{(the number of error packets)}/\text{(the number of transmission packets)} \quad (5)$$

Regarding positions and frequency channels where a sufficient number of transmission results are not accumulated, the packet error rate calculated based on the SIR is used similarly to the second embodiment. The operations of the present embodiment other than those described above are similar to those in the second embodiment.

In the above, the example has been described in which the transmission measurement units are added to the ground station 7 and the on-board station 8 of the second embodiment. However, the transmission measurement units may be added to the ground station and the on-board station of the first embodiment or the third embodiment, and the communication quality evaluation unit 403 of the radio wave monitoring apparatus 4 may determine the transmission result to calculate the non-transmission probability similarly to the above. In the case where the transmission measurement units are added to the ground station and the on-board station of the first embodiment, and when a number of data are accumulated as a transmission result, the number of which being equal to or larger than a predetermined threshold, the packet error rate calculated by the above formula (5) is used instead of $P(SI_i)$ in the formula (2).

As described above, according to the wireless communication system of the present embodiment, a configuration is employed in which the actual transmission result is added when calculating the non-transmission probability. Consequently, it is possible to eliminate a difference in the packet error rate caused depending on types of interference even in a case of the interference of the same intensity, to evaluate the communication quality more accurately, and to achieve a stable wireless communication system.

Fifth Embodiment

Figure 24:
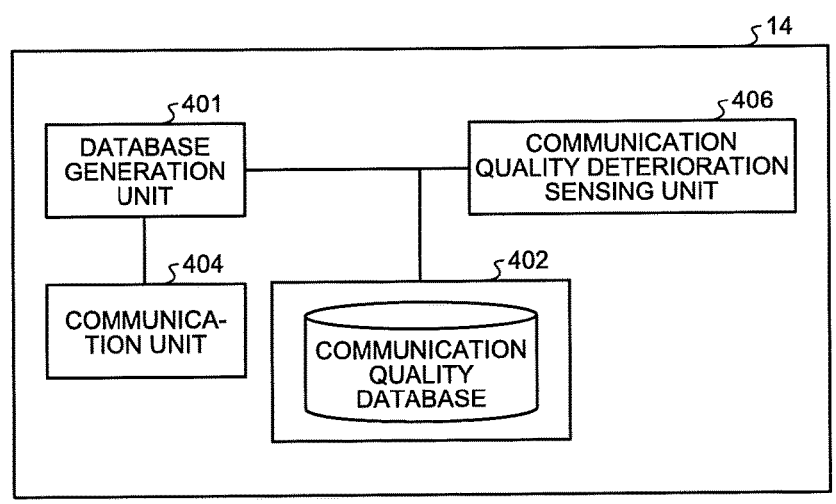
FIG. 24 is a diagram illustrating a configuration example of a radio wave monitoring apparatus of a fifth embodiment.

Next, a wireless communication system of a fifth embodiment according to the present invention will be described. FIG. 24 is a diagram illustrating a configuration example of a radio wave monitoring apparatus 14 of the present embodiment. The wireless communication system of the present embodiment is similar to the wireless communication system of the first embodiment except that the radio wave monitoring apparatus 14 is included instead of the radio wave monitoring apparatus 4 of the first embodiment. Constituent elements having functions similar to those in the first embodiment are denoted by the same reference numerals as those in the first embodiment, and overlapping descriptions will be omitted. Hereinafter, portions different from those in the first embodiment will be described.

The radio wave monitoring apparatus 14 is similar to the radio wave monitoring apparatus 4 of the first embodiment except that a communication quality deterioration sensing unit 406 as an evaluation unit is included instead of the communication quality evaluation unit 403 of the first embodiment.

In the present embodiment, the database generation unit 401 stores a signal level and an interference level in a communication quality database based on measurement data received from each ground station 1, but at that time, the database generation unit 401 performs an averaging process such as averaging using a moving average or a forgetting factor similar to that in the first embodiment, and stores processed data. The averaging process similar to that in the first embodiment is referred to as a long-term average and data obtained by the long-term average is referred to as long-term average data. In addition to the long-term average data, the database generation unit 401 performs a short-term average, which is an averaging process in a period shorter than a target period of the process of the long-term average, and stores processed data as short-term average data in the communication quality database. That is, the database generation unit 401 stores first communication quality information calculated based on a measurement result of a first period, which is a normal averaging period, and second communication quality information calculated based on a measurement result of a second period shorter than the first period in the communication quality database of the storage unit 402.

Figure 25:
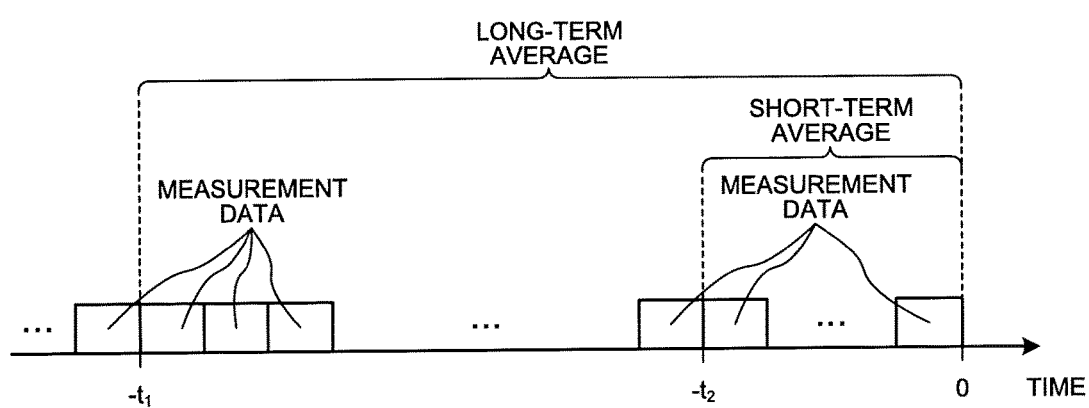
FIG. 25 is a schematic diagram illustrating a long-term average and a short-term average of the fifth embodiment.

FIG. 25 is a schematic diagram illustrating the long-term average and the short-term average of the present embodiment. In the example illustrated in FIG. 25, when time corresponding to latest measurement data is 0, the long-term average is a moving average of measurement data during a period from the time corresponding to the latest measurement data to time traced back from the time corresponding to the latest measurement data by $t_1$, and the short-term average is a moving average of measurement data during a period from the time corresponding to the latest measurement data to time traced back from the time corresponding to the latest measurement data by $t_2(t_2 < t_1)$. The communication quality deterioration sensing unit 406 calculates a non-transmission probability based on the long-term average data which is the first communication quality information similarly to the first embodiment, and calculates a non-transmission probability based on the short-term average data which is the second communication quality information similarly to the first embodiment. When the non-transmission probability calculated based on the long-term average data, that is, the non-transmission probability described in the first embodiment is denoted by $Q_{mes1}$ and the non-transmission probability calculated based on the short-term average data is denoted by $Q_{mes2}$, the communication quality deterioration sensing unit 406 determines that wireless communication quality has deteriorated and gives a warning when $Q_{mes2}-Q_{mes1}$ exceeds a predetermined first threshold, and $Q_{mes2}$ exceeds a predetermined second threshold. That is, the communication quality deterioration sensing unit 406 detects deterioration of the wireless communication quality based on $Q_{mes1}$ and $Q_{mes2}$. The operations of the present embodiment other than those described above are similar to those in the first embodiment. By performing evaluation using $Q_{mes2}-Q_{mes1}$, it is possible to determine whether there occurs a sharp short-term change as compared with a normal state.

In the above, the example has been described in which the non-transmission probabilities are calculated using the long-term average data and the short-term average data in the wireless communication system of the first embodiment. However, in the wireless communication system of the second, third, or fourth embodiment, similarly, the radio wave monitoring apparatus may calculate the non-transmission probabilities using the long-term average data and the short-term average data, and may perform the threshold determination of the present embodiment by using the non-transmission probabilities.

Similarly to the communication quality evaluation unit 403, the communication quality deterioration sensing unit 406 may be achieved as the processing circuit 900 which is dedicated hardware as illustrated in FIG. 6, or may be achieved by the control circuit 901 illustrated in FIG. 7.

As described above, in the wireless communication system of the present embodiment, a configuration is employed in which the communication quality is evaluated from an observation result obtained in a short term as well, in addition to an observation period of normal measurement data. Therefore, it becomes possible to appropriately grasp the deterioration of communication quality as compared with the normal state, to detect a portion to be dealt with at an early stage, which makes it easier to achieve a stable wireless communication system.

Sixth Embodiment

Figure 26:
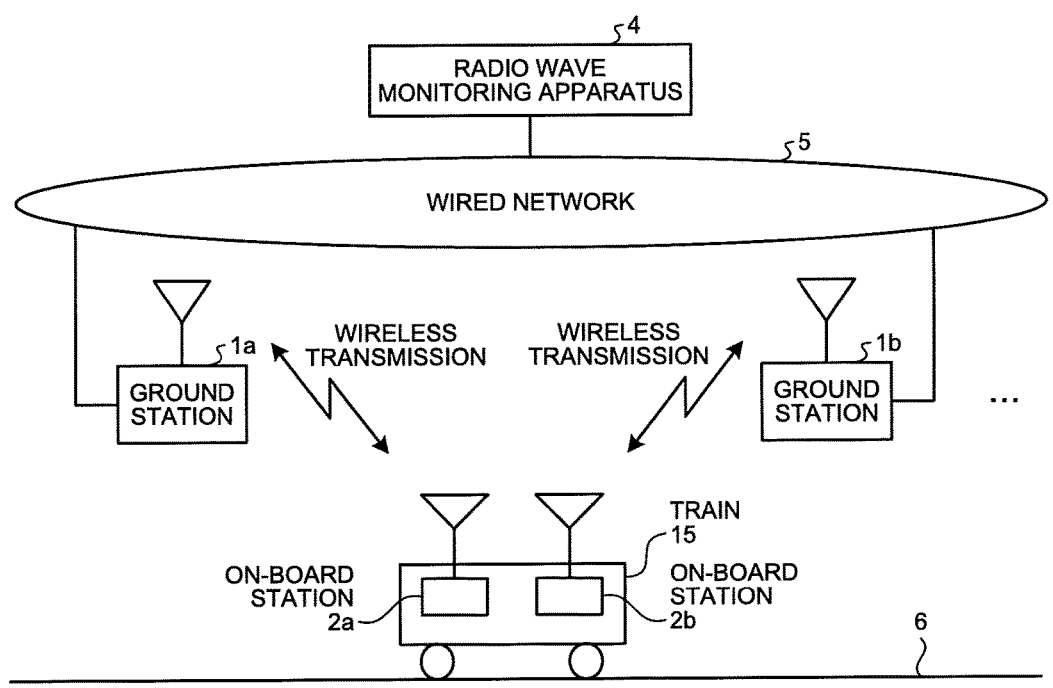
FIG. 26 is a diagram illustrating a configuration example of a wireless communication system of a sixth embodiment.

FIG. 26 is a diagram illustrating a configuration example of a wireless communication system of a sixth embodiment according to the present invention. The wireless communication system of the present embodiment is similar to the wireless communication system of the first embodiment except that a train 15 is included instead of the train 3. Constituent elements having functions similar to those in the first embodiment are denoted by the same reference numerals as those in the first embodiment, and overlapping descriptions will be omitted. Hereinafter, portions different from those in the first embodiment will be described.

Figure 27:
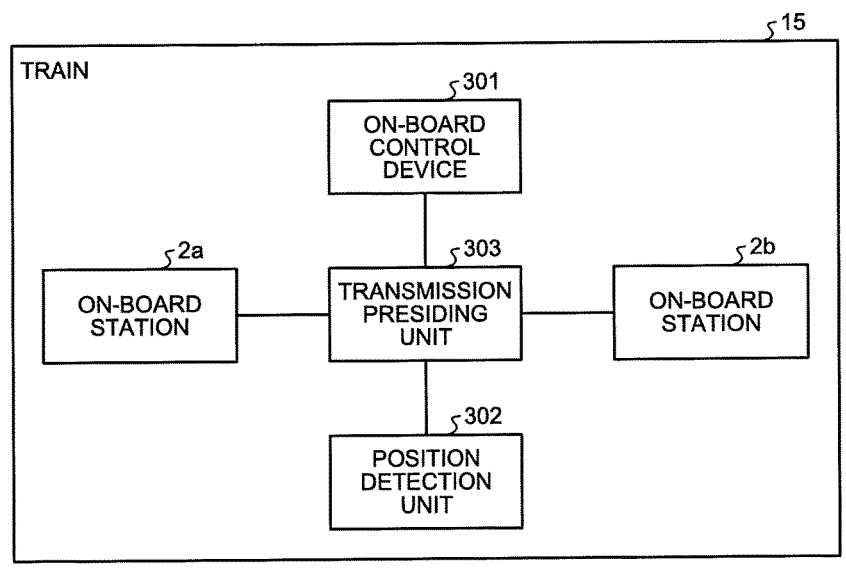
FIG. 27 is a diagram illustrating a configuration example of a train of the sixth embodiment.

As illustrated in FIG. 26, the train 15 of the present embodiment includes a plurality of on-board stations. FIG. 27, is a diagram illustrating a configuration example of the train 15 of the present embodiment. As illustrated in FIGS. 26 and 27, the train 15 includes on-board stations 2a and 2b, the on-board control device 301, the position detection unit 302, and a transmission presiding unit 303. Each of the on-board stations 2a and 2b has a configuration similar to the on-board station 2 of the first embodiment. The on-board control device 301 and the position detection unit 302 are similar to those in the first embodiment.

In the present embodiment, the on-board station 2a and the on-board station 2b mounted on the same train 15 are connected to the ground stations 1 different from each other. In the example of FIG. 26, the on-board station 2a is connected to the ground station 1a and the on-board station 2b is connected to the ground station 1b. Physically, the on-board stations 2a and 2b are respectively installed, for example, in a front portion of a leading vehicle and in a rear portion of a rearmost vehicle of a train including a plurality of vehicles.

The transmission presiding unit 303 illustrated in FIG. 27 is connected to the on-board stations 2a and 2b, and outputs position information detected by the position detection unit 302 to the on-board stations 2a and 2b. In addition, the transmission presiding unit 303 receives control information received by the on-board station 2a and control information received by the on-board station 2b from the on-board stations 2a and 2b, respectively, and sends the control information to the on-board control device 301. At that time, the transmission presiding unit 303 performs control which includes sending control information of one of the two on-board stations which was received earlier within a certain period to the on-board control device 301.

Signal levels and interference levels measured by the on-board stations 2a and 2b are transmitted to the ground stations 1 connected to the on-board stations, similarly to the first embodiment. The ground stations 1 transmit measurement data received from the on-board stations to the radio wave monitoring apparatus 4, similarly to the first embodiment.

The communication quality evaluation unit 403 of the radio wave monitoring apparatus 4 calculates a non-transmission probability on the premise that there are two wireless links at a position of each train. That is, when a non-transmission probability in wireless transmission in the on-board station 2a is denoted by $Q_{mesa}$ and a non-transmission probability in wireless transmission in the on-board station 2b is denoted by $Q_{mesb}$, the communication quality evaluation unit 403 calculates the non-transmission probability $Q_{mesa}$ similarly to the first embodiment based on the signal level and the interference level corresponding to the on-board station 2a, and calculates the non-transmission probability $Q_{mesb}$ similarly to the first embodiment based on the signal level and the interference level corresponding to the on-board station 2b. Then, the communication quality evaluation unit 403 calculates, by the following formula (6), a non-transmission probability $Q_{mes\_total}$ in consideration of $Q_{mesa}$ and $Q_{mesb}$, that is, a probability that control information from any of the two on-board stations is unreachable.

$$Q_{mes\_total} = Q_{mesa} \times Q_{mesb} \quad (6)$$

When $Q_{mes\_total}$ exceeds a threshold, the communication quality evaluation unit 403 gives a warning. The operations of the present embodiment other than those described above are similar to those in the first embodiment. Although two on-board stations are mounted on one train in the above example, three or more on-board stations may be mounted. In that case, similarly to the case of two on-board stations, the radio wave monitoring apparatus 4 stores the measurement data in the communication database for each on-board station, calculates the non-transmission probability for each on-board station, and multiplies the non-transmission probabilities corresponding to the train 15, that is, the thus calculated non-transmission probabilities of all the on-board stations mounted on the train 15, thereby calculating the non-transmission probability.

The transmission presiding unit 303 may be achieved as the processing circuit 900 which is dedicated hardware as illustrated in FIG. 6, or may be achieved by the control circuit 901 illustrated in FIG. 7.

In the above, the example has been described in which a plurality of on-board stations is mounted on the train in the wireless communication system of the first embodiment. However, a plurality of on-board stations may be mounted on the train in the wireless communication system of each of the second to fifth embodiments. In these cases as well, the radio wave monitoring apparatus stores the measurement data in the communication database for each on-board station, calculates the non-transmission probability for each on-board station, and multiplies the thus calculated non-transmission probabilities of all the on-board stations, thereby calculating the non-transmission probability.

As described above, in the wireless communication system of the present embodiment, a configuration is employed in which a plurality of on-board stations is mounted on the train, and the non-transmission probability is calculated in consideration of a plurality of wireless links, and evaluated. Therefore, it is possible to appropriately evaluate the non-transmission probability even in a system having a plurality of on-board stations mounted on a train, which makes it possible to achieve a stable wireless communication system.

Seventh Embodiment

Figure 28:
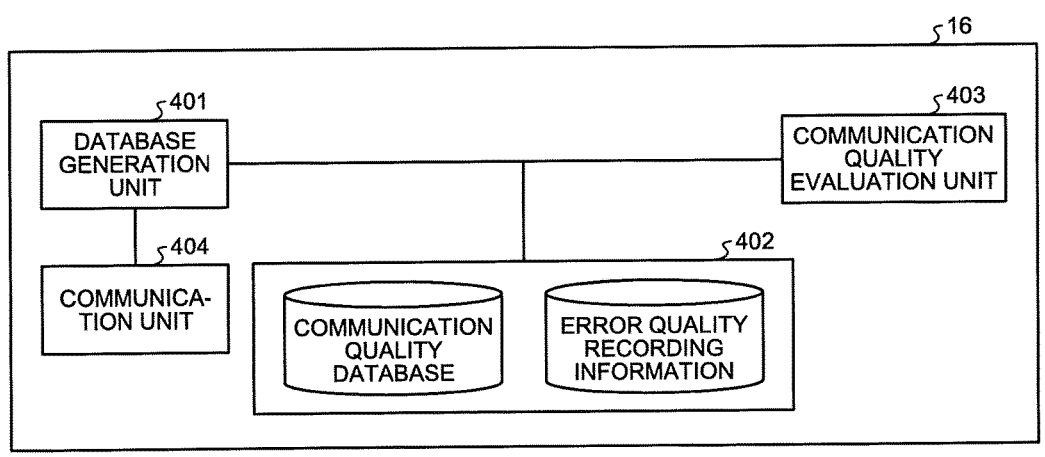
FIG. 28 is a diagram illustrating a configuration example of a radio wave monitoring apparatus of a seventh embodiment.

FIG. 28 is a diagram illustrating a configuration example of a radio wave monitoring apparatus 16 of a seventh embodiment according to the present invention. The wireless communication system of the present embodiment is similar to the wireless communication system of the first embodiment except that the radio wave monitoring apparatus 16 is included instead of the radio wave monitoring apparatus 4. Constituent elements having functions similar to those in the first embodiment are denoted by the same reference numerals as those in the first embodiment, and overlapping descriptions will be omitted. Hereinafter, portions different from those in the first embodiment will be described.

As illustrated in FIG. 28, the radio wave monitoring apparatus 16 of the present embodiment is similar to the radio wave monitoring apparatus 4 of the first embodiment except that in addition to the communication quality database, error quality recording information is stored in the storage unit 402. In a case where the occurrence of a packet error is notified from the ground station 1, the database generation unit 401 of the present embodiment stores, as error quality recording information, signal levels and interference levels from a second time, which is a time a certain period before a first time which is a time when the packet error occurred, to the first time, that is, a time when the packet error occurred, in the storage unit 402 in association with positions and frequency channels. In the storage unit 402, the signal levels and the interference levels in a predetermined period received from the ground station 1 are stored in association with the measurement time thereof. From these pieces of information stored in the storage unit 402, the database generation unit 401 extracts the signal levels and the interference levels from a certain period before the time when the packet error occurred to the time when the packet error occurred, and stores the signal levels and the interference levels in the storage unit 402.

In the present embodiment, when the ground station 1 determines that there is a packet error in the packet received from the on-board station 2, the ground station 1 notifies the radio wave monitoring apparatus 16 that a packet error has occurred together with the time when determination that there is a packet error was made. When the on-board station 2 determines that there is a packet error in the packet received from the ground station 1, the on-board station 2 may transmit to the ground station 1 the fact that a packet error has occurred together with the time when determination that there is a packet error was made, and the ground station 1 may transmit these pieces of information to the radio wave monitoring apparatus 16. Thus, the radio wave monitoring apparatus 16 can grasp the time when the packet error occurred.

In the above, the example has been described in which the radio wave monitoring apparatus stores the error quality recording information in the wireless communication system of the first embodiment. However, the radio wave monitoring apparatus may store the error quality recording information in the wireless communication system of each of the second to sixth embodiments.

As described above, in the wireless communication system of the present embodiment, a configuration is employed in which the measurement results regarding the wireless communication quality when a packet error occurs are stored. Therefore, for example, a user can use these pieces of information to distinguish whether the cause of the packet error is communication quality due to a lot of interference or the like, or other factors such as breakdown of the device, early solution to the problem can be achieved, and a stable wireless communication system can be achieved.

The configuration described in the embodiments above indicates one example of the content of the present invention and can be combined with other known technology, and a part thereof can be omitted or modified without departing from the gist of the present invention.

REFERENCE SIGNS LIST 1, 1a, 1b, 7, 9, 11 ground station; 2, 2a, 2b, 8, on-board station; 3, 15 train; 4, 10, 14, 16 radio wave monitoring apparatus; 5 wired network; 6 track; 101, 201 antenna; 102, 202 RF unit; 103, 203 modulation/demodulation unit; 104, 204 control unit; 105, 205 level measurement unit; 106, 404 communication unit; 107, 206 frequency hopping control unit; 108, 207 transmission measurement unit; 111, 401 database generation unit; 112, 402 storage unit; 113, 403 communication quality evaluation unit; 301 on-board control device; 302 position detection unit; 303 transmission presiding unit; 405 evaluation presiding unit; 406 communication quality deterioration sensing unit; 800 wireless communication system.

The invention claimed is:

1. A monitoring apparatus comprising:
an evaluation circuit to notify degradation of communication quality of wireless communication when a non-transmission probability exceeds a threshold, the non-transmission probability having been calculated based on measurement results of communication quality including signal levels and interference levels measured in wireless communication between an on-board transceiver mounted on a moving object traveling on a predetermined route and ground transceivers installed along the route, and a condition by which it is determined that transmission information is unreachable in the wireless communication, wherein the measurement results are results measured by both the ground transceivers and the on-board transceiver.

2. The monitoring apparatus according to claim 1, comprising:
a memory; and
a generator to perform an averaging process on the measurement results received from the ground transceivers, and to store the measurement results after the averaging process as communication quality information in the memory, wherein
the evaluation circuit calculates the non-transmission probability based on the communication quality information.

3. The monitoring apparatus according to claim 2, wherein the evaluation circuit further calculates a non-transmission probability of wireless communication between the on-board transceiver and a second ground transceiver that is the ground transceiver adjacent to a first ground transceiver that is the ground transceiver normally connected to the on-board transceiver.

4. The monitoring apparatus according to claim 2, wherein the evaluation circuit detects deterioration of wireless communication quality based on a non-transmission probability calculated using first communication quality information calculated based on the measurement results of a first period, and a non-transmission probability calculated using second communication quality information calculated based on measurement results of a second period shorter than the first period.

5. The monitoring apparatus according to claim 2, wherein
a plurality of on-board transceivers is installed in the moving object, and
the evaluation circuit calculates a non-transmission probability for each of the on-board transceivers and calculates a non-transmission probability corresponding to the moving object based on the non-transmission probability calculated for each of the on-board transceivers.

6. The monitoring apparatus according to claim 2, wherein the generator stores the measurement results from a second time that is a certain time period before a first time when an error occurred in a packet in the wireless communication to the first time in the memory.

7. The monitoring apparatus according to claim 1, wherein frequency channels used in the wireless communication are switchable, and the measurement results are measured for each of the frequency channels.

8. The monitoring apparatus according to claim 7, wherein the measurement results further include the number of transmission packets that is the number of packets transmitted in the wireless communication and the number of error packets that is the number of packets determined to have an error among the transmission packets.

9. The monitoring apparatus according to claim 1, wherein frequency hopping is performed in the wireless communication, and the non-transmission probability is calculated based on a hopping pattern of the frequency hopping.

10. The monitoring apparatus according to claim 9, wherein the hopping pattern is determined for each of the ground transceivers based on the non-transmission probability.

11. The monitoring apparatus according to claim 1, wherein the condition by which it is determined that transmission information is unreachable in the wireless communication is the number of packets transmitted during a standby time determined in order to determine that the transmission information is unreachable in the on-board transceiver.

12. The monitoring apparatus according to claim 1, wherein the condition by which it is determined that transmission information is unreachable in the wireless communication is the number of times the same transmission information is transmitted consecutively.

13. A wireless communication system comprising an on-board transceiver mounted on a moving object traveling on a predetermined route, ground transceivers installed along the route, and a monitoring apparatus, wherein the monitoring apparatus comprises:
an evaluation circuit to notify degradation of communication quality of wireless communication when a non-transmission probability exceeds a threshold, the non-transmission probability having been calculated based on measurement results of communication quality including signal levels and interference levels measured in wireless communication between the on-board transceiver and the ground transceivers, and a condition by which it is determined that transmission information is unreachable in the wireless communication, wherein the measurement results are results measured by the ground transceivers and the on-board transceiver.

14. The wireless communication system according to claim 13, wherein
the on-board transceiver transmits the measurement results to the ground transceivers,
each of the ground transceivers transmits a first measurement result that is the measurement result measured by the ground transceiver and a second measurement result that is the measurement result received from the on-board transceiver to the monitoring apparatus, and
the evaluation circuit of the monitoring apparatus calculates a non-transmission probability based on the first and second measurement results received from the ground transceivers and a condition by which it is determined that transmission information is unreachable in the wireless communication, and notifies degradation of communication quality of wireless communication when the non-transmission probability exceeds a threshold.

15. The wireless communication system according to claim 13, wherein
the on-board transceiver transmits the measurement results to the ground transceivers, and
each of the ground transceivers calculates the non-transmission probability based on a first measurement result that is the measurement result measured by the ground transceiver, a second measurement result that is the measurement result received from the on-board transceiver, and a condition by which it is determined that transmission information is unreachable in the wireless communication, and transmits the non-transmission probability to the monitoring apparatus.

16. A communication quality monitoring method in a wireless communication system comprising an on-board transceiver mounted on a moving object traveling on a predetermined route, ground transceivers installed along the route, and a monitoring apparatus, the method comprising:

measuring measurement results of communication quality including signal levels and interference levels measured in wireless communication between the on-board transceiver and the ground transceivers, wherein the measurement results are results measured by the ground transceivers and the on-board transceiver;

calculating a non-transmission probability based on a condition by which it is determined that transmission information is unreachable in the wireless communication; and notifying degradation of communication quality of wireless communication when the non-transmission probability exceeds a threshold.

* * * * *